US008688296B2

(12) United States Patent
Bailey

(10) Patent No.: US 8,688,296 B2
(45) Date of Patent: Apr. 1, 2014

(54) METHOD FOR MAXIMUM DATA COLLECTION WITH A CONTROL MOMENT GYROSCOPE CONTROLLED SATELLITE

(76) Inventor: David A. Bailey, Glendale, AZ (US)

(*) Notice: Subject to any disclaimer, the term of this patent is extended or adjusted under 35 U.S.C. 154(b) by 695 days.

(21) Appl. No.: 12/619,599

(22) Filed: Nov. 16, 2009

(65) Prior Publication Data

US 2010/0140413 A1    Jun. 10, 2010

Related U.S. Application Data

(60) Provisional application No. 61/199,578, filed on Nov. 17, 2008.

(51) Int. Cl.
*B64G 1/36* (2006.01)
*G05D 1/00* (2006.01)
*G05D 3/00* (2006.01)
*G06F 7/00* (2006.01)
*G06F 17/00* (2006.01)

(52) U.S. Cl.
USPC ............................................. 701/13; 244/165

(58) Field of Classification Search
USPC ............... 244/165, 164, 158.4, 158.1; 701/13
See application file for complete search history.

(56) References Cited

U.S. PATENT DOCUMENTS 6,154,691 A    11/2000  Bailey
6,305,647 B1   10/2001  Defendini et al.

OTHER PUBLICATIONS

J. Kranton; Minimum-Time Attitude Maneuvers of Spacecraft with Control Moment Gyroscopes (CMGs); Jun. 24, 1969; pp. 1-16.*
Elrod et al.; Equilibrium Properties of the Skylab CMG Rotation Law; Mar. 31, 1972; pp. 1-79.*
Fleming and Ross; Minimum-Time Maneuvering of Cmg-Driven Spacecraft; 2007; Proceedings of the Advances in the Astroanautical Sciences AAS/AIAA Astrodynamics Specialist Conference; vol. 129; pp. 1623-1644.*
Heiberg et al., "Precision Spacecraft Pointing Using Single-Gimbal Control Moment Gyroscopes with Disturbance", Journal of Guidance, Control and Dynamics, vol. 23, No. 1, Jan.-Feb. 2000, pp. 77-85.
Harris, E. et al. *Design of $H_2O_2$ Space Shuttle APU*, vol. 1-APU Design, NASA CR-121214, Jan. 1974, 267 pgs.

* cited by examiner

*Primary Examiner* — Tien Dinh
*Assistant Examiner* — Michael A Fabula
(74) *Attorney, Agent, or Firm* — Christie, Parker & Hale, LLP

(57) ABSTRACT

The present invention relates to a method for maneuvering an imaging satellite, and more particularly a method for commanding control moment gyroscopes on an imaging satellite to change the attitude of the satellite. In one embodiment, a method for generating a gimbal rate trajectory for maneuvering a satellite to point to a target includes providing a final attitude for pointing to the target and a final satellite rate for imaging the target, providing an initial attitude and an initial set of gimbal angles, and determining a gimbal rate trajectory from the initial set of gimbal angles to a final set of gimbal angles.

9 Claims, 17 Drawing Sheets

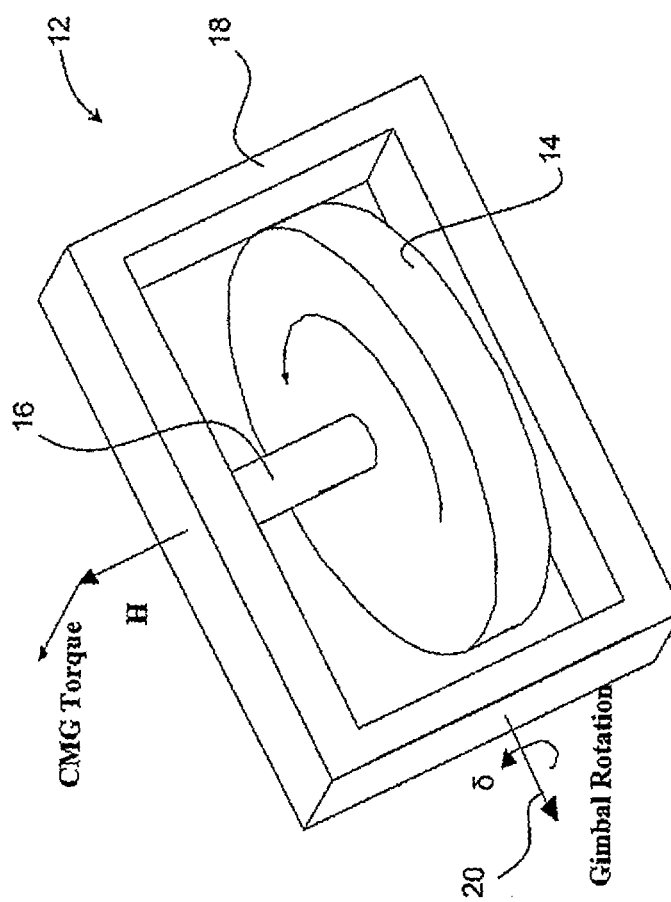
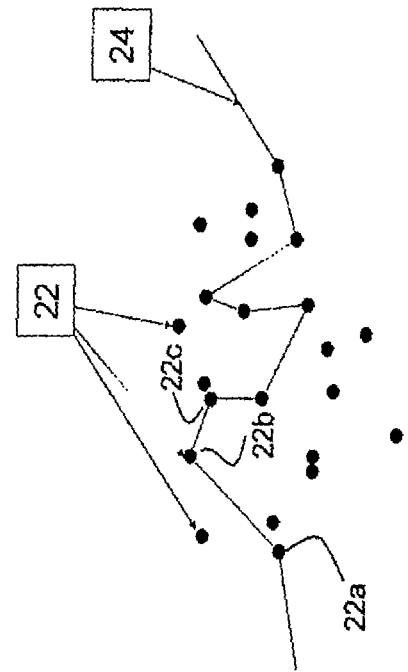
Figure 1
PRIOR ART
Figure 2

Time Angle

Time Angle

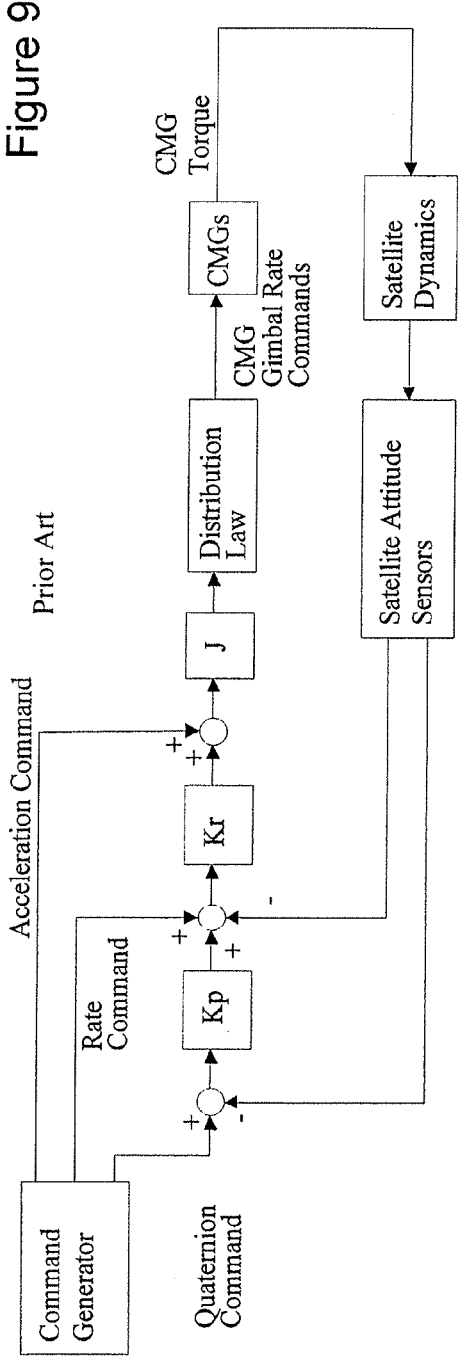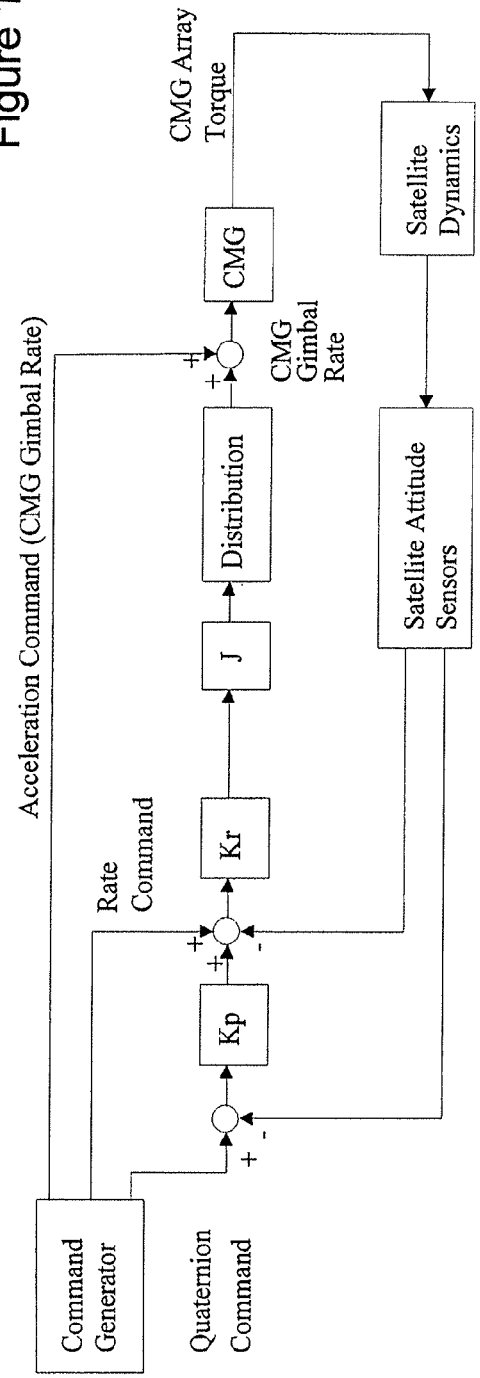

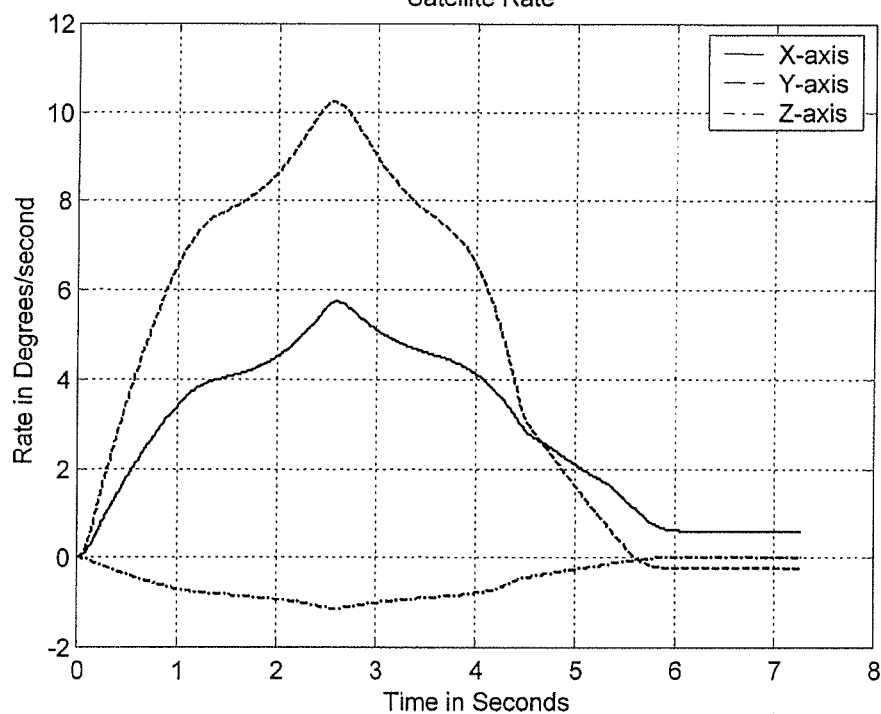
Figure 12A — Satellite Rate — Prior Art
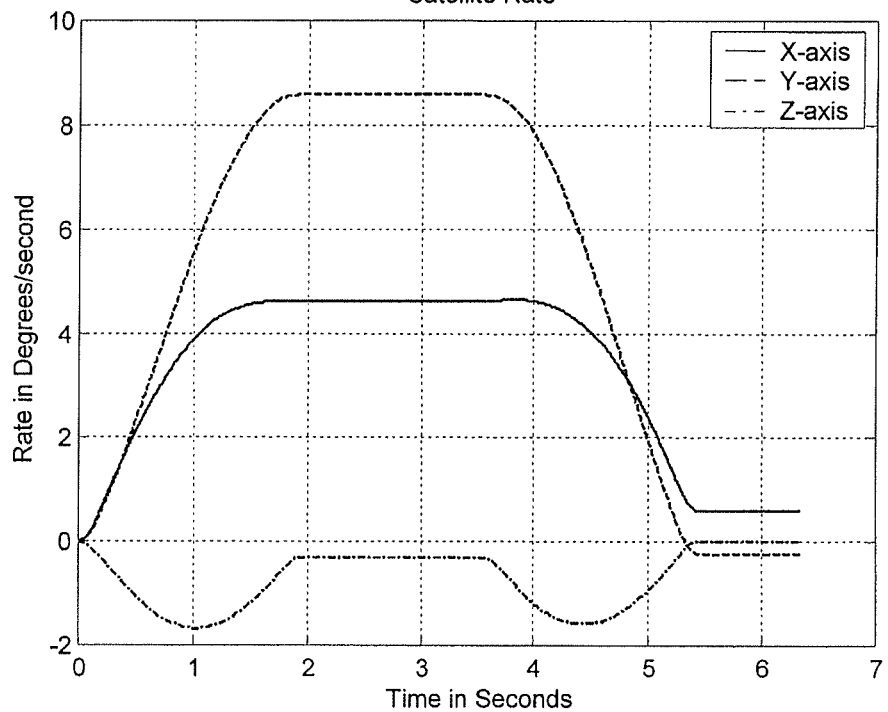
Figure 12B — Satellite Rate CMG Gimbal Rates CMG Gimbal Rates CMG Gimbal Accelerations CMG Gimbal Accelerations CMG Gimbal Angles CMG Gimbal Rates

METHOD FOR MAXIMUM DATA COLLECTION WITH A CONTROL MOMENT GYROSCOPE CONTROLLED SATELLITE

CROSS-REFERENCE TO RELATED APPLICATION(S)

This application claims priority to and the benefit of U.S. Provisional Patent Application No. 61/199,578 filed on Nov. 17, 2008, the entire contents of which are incorporated herein by reference.

FIELD OF THE INVENTION

The present invention relates to a method for maneuvering an imaging satellite, and more particularly a method for commanding control moment gyroscopes on an imaging satellite to change the attitude of the satellite.

BACKGROUND OF THE INVENTION

Image satellite planning is a planning process used to determine the pointing path that an imaging satellite takes as it passes over a set of targets on the ground. In order to take an image of a particular target on the ground, the satellite needs to be pointed in the correct direction, meaning the satellite has a particular attitude. Additionally, in order to take a scanning image over a target, the satellite needs to move at the correct scanning velocity, meaning the satellite has a particular satellite rate (the angular velocity of the satellite, also called the attitude rate or scan rate). For example, the scan rate may be about 0.75 degrees per second. The desired attitude and attitude rate for the imaging pass are determined based on the location and size of the image on the ground, and other factors regarding the image being taken. Then, a maneuver is calculated in order to move the satellite from its initial attitude and attitude rate to the desired attitude and attitude rate at the correct time for the imaging pass.

In order to execute this maneuver and change the attitude of the satellite, the satellite has some type of onboard attitude control system. One type of onboard attitude control system includes a set of control moment gyroscopes ("CMG") as well as a command generator, a sensor package, and a set of control laws. A satellite needs at least three separate CMG's in order to have complete control over its attitude in three-dimensional space. An example of a single CMG 12 is shown in FIG. 1. The CMG includes a rotor such as wheel 14 that spins about an axis 16. The rotor 14 is supported by a frame 18 that is mounted to the satellite through a gimbal (a pivoted support that allows the frame 18 to rotate about axis 20). The angular momentum vector H of the rotor 14 is parallel to the axis 16. The frame 18 can be rotated about a second axis 20, which is perpendicular to the axis 16 and angular momentum vector H. The angle of rotation of the frame 18 about the axis 20 is the gimbal angle δ.

The satellite includes at least three CMG's, and often includes up to six. The number of CMG's on the satellite is referred to as "n" CMG's. The CMG's are mounted to the satellite such that the planes defined by the axes 16 and 20 of each CMG are angled with respect to each other. Each one of the CMG's can be rotated about its axis 20 to a particular gimbal angle δ. The gimbal angles of all n CMG's may be referred to as the set or vector of gimbal angles. At one set of gimbal angles, the satellite has no angular momentum, as the sum of all of the angular momentum vectors H of the n CMG's is zero. At this position, each gimbal angle δ of each CMG may be defined as zero. If one of the frames 18 is rotated to change the gimbal angle δ, then the sum of the angular momentum vectors H is no longer zero, and angular momentum is imparted to the satellite.

At any set of non-zero gimbal angles δ, the satellite is rotating about some axis, with an angular momentum and satellite rate. While the gimbal angles δ are changing, the satellite is accelerating. While the gimbal angles δ are constant and non-zero, the satellite is rotating. When the gimbal angles are constant and zero, the satellite is not rotating. The satellite's angular momentum vector H corresponds to one or more sets of gimbal angles. For angular momentum vectors below the maximum angular momentum envelope, several different sets of gimbal angles can provide the same angular momentum H to the satellite. A maximum angular momentum vector has a unique set of gimbal angles. The gimbal angle vectors 8 and corresponding angular momentum vectors H can be mapped to each other.

In order for the satellite to image a set of targets on the ground, the attitude of the satellite has to be controlled in order to point the satellite in the correct direction at the correct time and with the correct scanning velocity (satellite rate). An example set of targets 22 on the ground is shown in FIG. 2. The satellite follows a pointing path 14 to image a select subset of targets 22a, 22b, 22c, etc, during the satellite's pass overhead. Between each target 22a, 22b, 22c, the satellite executes a maneuver to reorient the satellite to point in the correct direction to image the next target.

There are various prior art methods for calculating this attitude-changing maneuver. One prior art method calculates the maneuver in angular momentum space, meaning that the satellite attitude, rate, and acceleration are used to determine the desired trajectory, and the CMG's are rotated as needed to initiate satellite rotation along this trajectory. The shortest distance in angular momentum space is an Eigen axis maneuver, where the satellite is rotated about a single vector. The CMG's are then further rotated as needed to increase the magnitude of rotation about this vector until the final angular momentum is reached.

However, this prior art method does not provide the minimum time maneuver for moving the satellite to the desired imaging attitude and attitude rate. The present invention provides a method for commanding the CMG's and maneuvering the satellite to the desired attitude and attitude rate with a shorter-duration maneuver. As a result, less time is required for each maneuver, and more time is available in the imaging pass for taking images of the targets.

SUMMARY OF THE INVENTION

The present invention relates, for example, to a method for maneuvering an imaging satellite, and more particularly a method for commanding control moment gyroscopes on an imaging satellite to change the attitude of the satellite. In one embodiment, the method includes generating a gimbal rate trajectory for the CMG's, transmitting the gimbal rate trajectory to the satellite, and moving each CMG along the gimbal rate trajectory to execute the maneuver. The maneuver is designed in gimbal angle space, by determining the shortest path for the CMG's to move from the initial set of gimbal angles to the final, desired gimbal angles. In the prior art, the maneuver is designed in angular momentum space, rather than gimbal angle space, and the satellite is commanded in terms of a satellite acceleration trajectory (in 3 dimensions) rather than a gimbal rate trajectory (in n dimensions). In embodiments of the present invention, the maneuver designed in gimbal angle space has a shorter duration than prior art maneuvers designed in angular momentum space.

The shorter duration results in collection of a greater number (of higher value) images in an orbit.

In one embodiment, there is provided a method for changing the attitude of a satellite that is controlled by a plurality of control moment gyroscopes movable through gimbal angles. The method includes selecting a target for imaging, and determining a final attitude for pointing the satellite to the target and a final satellite rate for imaging the target. The method also includes providing an initial attitude and an initial set of gimbal angles comprising an initial gimbal angle for each control moment gyroscope, and generating a gimbal rate trajectory from the initial set of gimbal angles to a final set of gimbal angles comprising a final gimbal angle for each control moment gyroscope. The method also includes moving the control moment gyroscopes on the satellite according to the gimbal rate trajectory.

In one embodiment, there is provided a method for commanding a satellite to execute an attitude-change maneuver, for a satellite having control moment gyroscopes movable through gimbal angles. The method includes generating a gimbal rate trajectory, transmitting the gimbal rate trajectory to the satellite, commanding the control moment gyroscopes to follow the gimbal rate trajectory, sensing a movement of the satellite, generating a corrected gimbal rate trajectory based on the sensed movement, and commanding the control moment gyroscopes to follow the corrected gimbal rate trajectory.

In one embodiment, there is provided a method for generating a gimbal rate trajectory for maneuvering a satellite to point to a target. The method includes providing a final attitude for pointing to the target and a final satellite rate for imaging the target, providing an initial attitude and an initial set of gimbal angles, using a computer to determine a gimbal rate trajectory from the initial set of gimbal angles to a final set of gimbal angles, and using the computer to generate an output file comprising the gimbal rate trajectory.

In one embodiment, there is provided a method for maneuvering a satellite to point to a target, for a satellite having a plurality of control moment gyroscopes movable through gimbal angles. The method includes moving each control moment gyroscope through a respective gimbal angle trajectory from an initial gimbal angle to an interim gimbal angle and from the interim gimbal angle to a final gimbal angle. The gimbal angle trajectory for each control moment gyroscope includes a first path from the initial gimbal angle to the interim gimbal angle, and a second path from the interim gimbal angle to the final gimbal angle. The first and second paths each have a first derivative that does not cross zero. All of the control moment gyroscopes on the satellite move through respective first and second paths. The maneuver is greater than 1 degree in angular distance.

In one embodiment, there is provided a method for maneuvering a satellite to point to a target, for a satellite having a plurality of control moment gyroscopes movable through gimbal angles. The method includes moving each control moment gyroscope through a respective gimbal rate trajectory from an initial gimbal angle to a final gimbal angle. The gimbal rate trajectory for a first control moment gyroscope includes a substantially maximum gimbal acceleration to a first interim gimbal rate, and a substantially maximum deceleration to a zero gimbal rate. The gimbal rate trajectory for the remaining control moment gyroscopes includes respective gimbal accelerations and interim gimbal rates that are proportional to the substantially maximum gimbal acceleration and to the first interim gimbal rate. The maneuver is greater than 1 degree in angular distance.

In one embodiment, there is provided a method for maneuvering a satellite to point to a target, for a satellite having a plurality of control moment gyroscopes movable through gimbal angles. The method includes simultaneously accelerating each control moment gyroscope to a respective first velocity, simultaneously moving each control moment gyroscope at its respective first velocity to an interim gimbal angle, simultaneously accelerating each control moment gyroscope to a respective second velocity, and simultaneously moving each control moment gyroscope at its respective second velocity to a final gimbal angle. The maneuver is greater than 1 degree in angular distance.

In one embodiment, there is provided a method for maneuvering a satellite to point to a target, for a satellite having a plurality of control moment gyroscopes movable through gimbal angles. The method includes moving the control moment gyroscopes through a gimbal rate trajectory, and imparting angular momentum to the satellite as a result of the movement of the control moment gyroscopes. An angular momentum vector of the satellite moves through a curved trajectory that deviates from a linear trajectory by greater than approximately 5%.

In one embodiment, there is provided a method for maneuvering a satellite to point to a target, for a satellite having a plurality of control moment gyroscopes movable through gimbal angles. The method includes moving each control moment gyroscope along a respective gimbal rate trajectory. The gimbal rate trajectories of all of the control moment gyroscopes are scaled proportionally to each other, and the maneuver is greater than 1 degree in angular distance.

In one embodiment, there is provided a method for maneuvering a satellite to point to a target, for a satellite having a plurality of control moment gyroscopes movable through gimbal angles. The method includes moving each control moment gyroscope according to a gimbal rate trajectory. The gimbal rate trajectories for all of the control moment gyroscopes on the satellite include at least first, second, and third distinct and simultaneous jerk pulses that are scaled proportionally to each other. The maneuver is greater than 1 degree in angular distance.

In one embodiment, a method for maneuvering a vehicle includes identifying a parameter for optimizing, determining a dominant constraint on the parameter, generating a maneuver in the mathematical domain that has the dominant constraint, and changing the position of the vehicle according to the maneuver. In one embodiment, the vehicle is a satellite, the parameter is maneuver duration, the dominant constraint is gimbal rate, and the mathematical domain is gimbal angle space.

BRIEF DESCRIPTION OF THE DRAWINGS

FIG. 1 is a perspective view of a control moment gyroscope.

FIG. 2 is a representation of a group of targets and a satellite pointing path through the targets.

FIG. 9 is a block diagram showing a prior art satellite controller.

FIG. 10 is a block diagram showing a satellite controller according to an embodiment of the invention.

FIG. 12A is a chart showing satellite rate over time according to the maneuver of FIG. 11A.

FIG. 12B is a chart showing satellite rate over time according to the maneuver of FIG. 11B.

DETAILED DESCRIPTION OF THE INVENTION

Figure 3A:
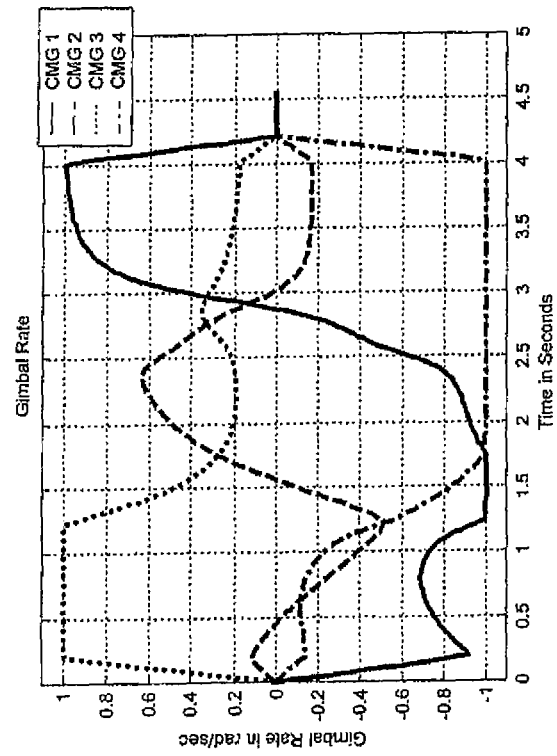
FIG. 3A is a chart showing gimbal angle versus time for an Eigen-axis maneuver.

The present invention relates, for example, to a method for maneuvering an imaging satellite, and more particularly a method for commanding control moment gyroscopes on an imaging satellite to change the attitude of the satellite. In one embodiment, the method includes generating a gimbal rate trajectory for the CMG's, transmitting the gimbal rate trajectory to the satellite, and moving each CMG along the gimbal rate trajectory to execute the maneuver. The maneuver is designed in gimbal angle space, by determining the shortest path for the CMG's to move from the initial set of gimbal angles to the final, desired gimbal angles. In the prior art, the maneuver is designed in angular momentum space, rather than gimbal angle space, and the satellite is commanded in terms of a satellite acceleration trajectory (in 3 dimensions) rather than a gimbal rate trajectory (in n dimensions). In embodiments of the present invention, the maneuver designed in gimbal angle space has a shorter duration than prior art maneuvers designed in angular momentum space. The shorter duration results in collection of a greater number (of higher value) images in an orbit.

During an imaging pass over a set of targets, it is desirable to minimize the duration of each maneuver, in order to maximize the time available for data collection. The duration of each maneuver is constrained by the mechanical limits of the CMG's themselves, specifically, how fast the frame 18 can accelerate and rotate about axis 20 (see FIG. 1). These are the CMG acceleration and velocity (gimbal rate) limits. Because the CMG's can move only so fast, there is a minimum time for each maneuver, as the CMG's cannot move any faster to rotate the satellite to its new position. Thus, the dominant constraint for the minimum-time maneuver is the CMG gimbal rate. The minimum time maneuver is found in the space with the dominant constraint—in this case, gimbal angle space. By controlling the satellite in the space with the dominant constraint, the present invention generates a shorter-duration maneuver than prior art methods, thereby enabling additional data collection.

In one embodiment, a method for maneuvering a vehicle includes identifying a parameter for optimizing, determining a dominant constraint on the parameter, generating a maneuver in the mathematical domain (or space) that has the dominant constraint, and changing the position of the vehicle according to the maneuver. As one example, the vehicle may be a satellite, and the maneuver may be an attitude-change maneuver. In many cases, including imaging satellite as well as other types of satellites, it is desired to minimize the duration of the maneuver, as the satellite often cannot perform other functions, such as imaging the ground, during the maneuver. Thus, the parameter for optimizing is the duration time. As explained above, the dominant constraint on maneuver duration for a CMG-controlled satellite is the CMG gimbal rate. When the CMG reaches its maximum gimbal rate, it simply cannot move any faster, and therefore the maneuver cannot be accomplished any faster. Accordingly, the method includes generating a maneuver in gimbal angle space, the mathematical domain that has the dominant constraint. Although this example refers to satellites and attitude-change maneuvers, this approach can be used in other fields as well.

Figure 3B:
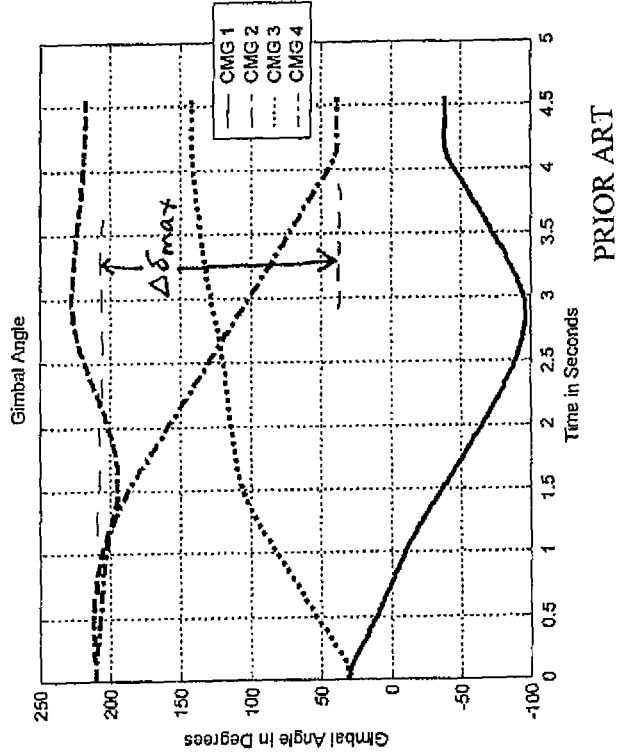
FIG. 3B is a chart showing gimbal rate versus time for the maneuver of FIG. 3A.
Figure 3C:
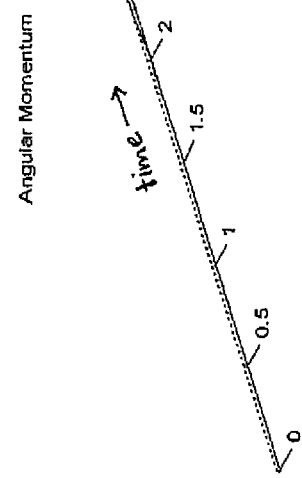
FIG. 3C is a chart showing the angular momentum trajectory for the maneuver of FIG. 3A (showing the sum of the angular momentum vectors of each CMG).

An example case was generated to compare a maneuver in angular momentum space (FIGS. 3A-C) and a maneuver in gimbal angle space (FIGS. 4A-C) for a satellite with four CMG's (n=4). In this example, the maneuver is designed to change the satellite's angular momentum vector H from zero to 3.5 units of angular momentum in the x direction. (Note, one "unit" of angular momentum is the total stored angular momentum of one CMG.) The maneuver in FIGS. 3A-C is designed in angular momentum space according to a prior art method. As shown in FIG. 3C, the maneuver is a direct line in angular momentum space, moving the satellite directly along the x-axis from zero to 3.5. This maneuver may be referred to as an "Eigen-axis" maneuver, as it moves along a straight line in angular momentum space, without changing direction. The maneuver causes the satellite to start rotating about the x axis, and then increases the rotation rate (the magnitude of the vector) to 3.5, without changing the axis of rotation (the direction of the vector). Torque is delivered to the satellite in a straight line (along the same unit vector). In order to accomplish this Eigen-axis maneuver, the CMG's move along the gimbal angle paths shown in FIG. 3A. The corresponding gimbal rate trajectories, to move the CMG's along the gimbal angle paths, are shown in FIG. 3B.

Thus, the maneuver shown in FIGS. 3A-C is designed by moving along a straight line in angular momentum space. The initial angular momentum of the satellite ($H_{current}$) is known from the relationship $H_{current} = J_{sat} * W_{sat}$ where $W_{sat}$ is the satellite's attitude rate (which can be determined from the current gimbal angles $\delta$) and $J_{sat}$ is the satellite's inertia tensor. In this example, $H_{current}$=zero. The final desired attitude is also known, from the location of the target on the ground. The final angular momentum is known from the relative motion of the satellite to the rotation of the earth and the scan rate. In this example, $H_{final}$=3.5 units about the x axis. The maneuver is designed to move straight from zero to 3.5 in the direction of the final angular momentum (in this example, the direction of the x-axis).

The trajectory of the maneuver is known in angular momentum space, since the initial and final angular momentum vectors are known, and the trajectory is straight. However, this trajectory needs to be converted into a gimbal rate trajectory in order for the satellite to actually command the individual CMG's to execute the maneuver. Thus, a calculation is done to map the known three-dimensional angular momentum trajectory (FIG. 3C) into n-dimensional gimbal angle and rate trajectories (FIGS. 3A and 3B). This transformation is set out below. It involves calculating the torque required to move the satellite to $H_{final}$ and then calculating the gimbal rates from the torque (as shown in Equations 1-4 below). This gives the gimbal rate vector over time (FIG. 3B). This trajectory can be integrated to arrive at the gimbal angle vector over time (FIG. 3A).

As shown in FIGS. 3A-B, the CMG's fluctuate and move back and forth to different gimbal angles in order to keep the angular momentum vector of the satellite straight (FIG. 3C). For example, CMG 1 in FIG. 3A starts at a gimbal angle of about 30 degrees, moves to about −100 degrees, and then returns back to a final gimbal angle of about −40 degrees. Thus, CMG 1 moves farther than it needs to move to reach its final gimbal angle. Also, CMG 2 moves from about 210 degrees to below 200 degrees and then moves up to about 230 degrees before moving back to a final angle near where it started. This non-intuitive movement of the CMG's is the result of the Eigen-axis trajectory shown in FIG. 3C. In order to keep the satellite's angular momentum vector pointed in the same direction (along the x-axis) throughout the duration of the maneuver, the CMG's move forward and back to compensate for each other to deliver the necessary torque to the satellite to keep the H vector pointed in one direction.

One difficulty with this prior art method is the use of torque to determine gimbal angles. As just discussed, the three-dimensional satellite acceleration trajectory is transformed into an n-dimensional gimbal rate trajectory. This transformation may be referred to as the "distribution law", and it takes place as follows:

$$H_{CMG} = (\delta_{ref}\cos(\delta) + \delta_{quad}\sin(\delta)) \cdot h_{CMG} \quad (1)$$

$$\frac{dH}{dt} = (-\delta_{ref}\sin(\delta) + \delta_{quad}\cos(\delta)) \cdot \dot\delta \cdot h_{CMG} \quad (2)$$

$$A = -\delta_{ref}\sin(\delta) + \delta_{quad}\cos(\delta) \quad (3)$$

$$\dot\delta = A^T(A \cdot A^T)^{-1}\frac{dH}{dt} \quad (4)$$

A trajectory in angular momentum space is mapped into gimbal angle space by this distribution law. Equation 4 takes the three-dimensional torque dH/dt and maps it into n-dimensional gimbal rate $\dot\delta$. In these equations, $H_{CMG}$ is the sum of the angular momentum of all of the CMG's, and CMG is the angular momentum stored in one CMG. The torque is dH/dt, and $\delta$ is the gimbal angle vector (which is time-variable). $\delta_{ref}$ and $\delta_{quad}$ are unit vectors for the direction of the CMG's angular momentum when the CMG gimbal angle is zero and 90 degrees, respectively.

In Equation 3, the term "A" is defined, and this is a matrix referred to as the "A matrix." The A matrix is a nonlinear matrix that couples angular momentum space and gimbal angle space. The term $A^T(A \cdot A^T)^{-1}$ is a pseudoinverse matrix (when n is greater than 3, it cannot be inverted directly, so pseudoinverse techniques are used). As shown above, the gimbal rate trajectory $\dot\delta$ is calculated by multiplying the pseudoinverse matrix by the torque (dH/dt). The torque (dH/dt) was calculated from the known angular momentum trajectory. Additional information on the equations that govern this problem and other background on satellite dynamics can be found in "Space Vehicle Dynamics and Control", Bong Wie, AIAA Education Series, ISBN 1-56347-261-9.

The "A matrix" is a time-variable matrix of gimbal angles. At certain gimbal angles, the A matrix is singular and cannot be inverted, creating a "singularity." A singularity is a point where a mathematical object is not defined because it attempts to divide by zero. Mechanically, this means that there is a direction that torque cannot be delivered. The torque from a CMG is a vector that is perpendicular to the CMG's angular momentum vector and perpendicular to the CMG gimbal axis 20 (FIG. 1). The torque is generated by rotating the angular momentum vector. As the torque is generated, the torque vector is rotating. If all of the possible torque vectors from all of the CMG's are coplanar then the CMG's cannot deliver torque perpendicular to the plane, and the A matrix becomes singular. One such case is when all the angular momentum the CMG array can deliver has been delivered in a particular direction, all the possible torques are perpendicular to this angular momentum vector and the A matrix becomes singular in what is known as a saturation singularity. Singularities can occur internal to the CMG angular momentum envelope. This singularity disrupts the calculation needed to arrive at the required gimbal rates (to get from torque to gimbal rate). Therefore, this method requires a control algorithm or contingency for handling the singularity.

In this description, when the Eigen-axis maneuver is described as "straight" or "linear," it should be understood that the maneuver is substantially straight, although it may deviate slightly from a straight line, for example, in order to avoid a singularity as just described. Aside from these small deviations, the maneuver moves in a straight line along a single vector in angular momentum space. This may be referred to as straight or substantially straight.

Figure 4A:
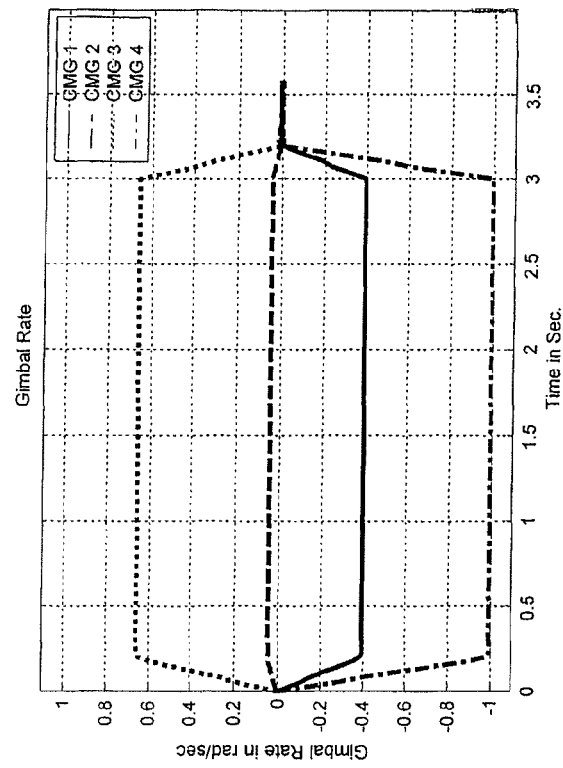
FIG. 4A is a chart showing gimbal angle versus time for a maneuver according to an embodiment of the invention.
Figure 4B:
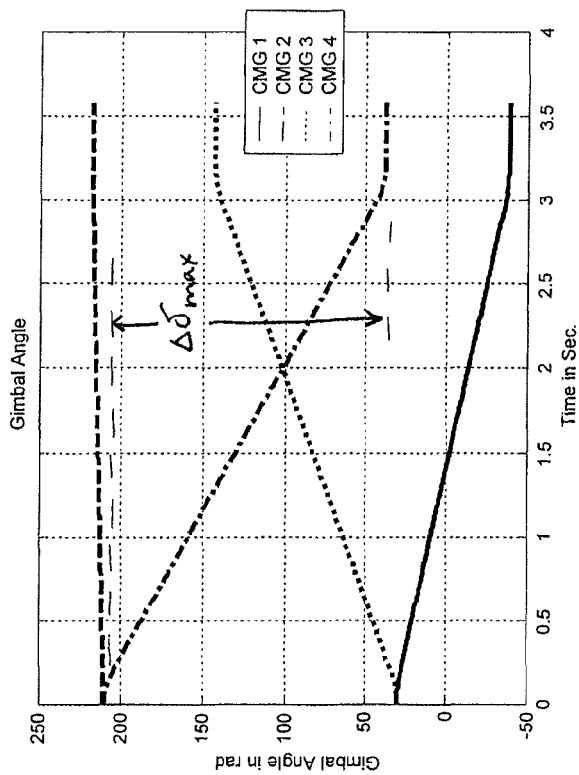
FIG. 4B is a chart showing gimbal rate versus time for the maneuver of FIG. 4A.
Figure 4C:
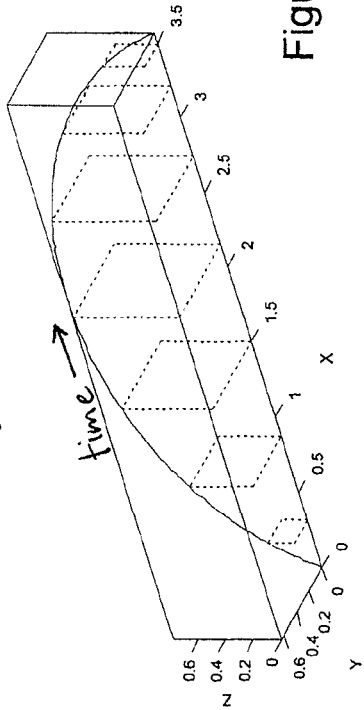
FIG. 4C is a chart showing the angular momentum trajectory for the maneuver of FIG. 4A (showing the sum of the angular momentum vectors of each CMG).

FIGS. 4A-C show a different maneuver provided according to an embodiment of the invention. This maneuver utilizes different gimbal angle and rate trajectories than those shown above but still arrives at the same final angular momentum— 3.5 units in the x-direction. In this embodiment, the maneuver is designed in gimbal angle space rather than angular momentum space. As a result, the angular momentum trajectory (FIG. 4C) does not necessarily follow a straight line. However, the gimbal angle paths are more direct, and the CMG's move to their final positions more quickly. The overall maneuver takes less time, and more time is available for data collection during the satellite's imaging pass.

As before, the initial angular momentum of the satellite and the desired final angular momentum are known. With four CMG's onboard the satellite, there is at least one final gimbal angle vector that provides the desired final angular momentum. This four-dimensional vector gives the desired final angle for each of the four CMG's. When the four CMG's are positioned at those angles, the angular momentum of the CMG's sums to 3.5 units in the x-direction, which imparts an angular momentum to the satellite of −3.5 units in the x-direction. The maneuver in FIGS. 4A-C is designed by determining the desired final angular momentum, identifying the gimbal angle vectors that provide that final angular momentum, selecting the gimbal angle vector that requires the CMG's to move the least distance, calculating the gimbal angle trajectories (FIG. 4A) from the initial gimbal angle vector to the final gimbal angle vector, and calculating the gimbal rate trajectories (FIG. 4B) by maximizing the velocity of the CMG that moves the farthest and scaling the other three CMG's proportionately.

In this embodiment, the maneuver moves the CMG's directly to the final set of gimbal angles, as shown in FIG. 4A. The CMG's do not curve or move back and forth, but move straight to their respective final angles. By comparing FIGS. 3A and 4A, it is clear that the final gimbal angles are the same in both maneuvers. However, the gimbal angle trajectory is much different. The CMG's in FIG. 3A follow a curved, sometimes back-and-forth path before arriving at the final set of gimbal angles. The CMG's in FIG. 4A follow a straight path. The gimbal rate trajectory shown in FIG. 4B corresponds to this straight gimbal angle trajectory. As shown in FIG. 4C, the resulting angular momentum trajectory for the satellite is curved, rather than straight. This trajectory is not an Eigen-axis maneuver in angular momentum space, as the angular momentum trajectory curves, deviating by about 20% from the Eigen-axis trajectory (in FIG. 3C). In other embodiments, the angular momentum trajectory may deviate by greater than about 5%, or in other embodiments greater than about 10%, from a linear trajectory. The satellite rotates about a different axis as it moves to its final axis of rotation (the x-axis). In the end it rotates about the desired axis, but it does not do so during the entire duration of the maneuver.

Thus, the two maneuvers shown in FIGS. 3-4 both arrive at the same final angular momentum for the satellite and the same final set of gimbal angles. However, the gimbal angle, gimbal rate, and angular momentum trajectories are all different, and as a result the satellite's acceleration trajectory is also different.

Notably, the maneuver according to the embodiment above (FIGS. 4A-C) is designed without calculating the torque that needs to be imparted to the satellite. The satellite is controlled by moving the CMG's to desired angles, not by operating the CMG's to apply a desired torque. In the prior art method described above, torque is used as an input to arrive at the gimbal rate trajectory. The satellite acceleration trajectory is determined, and then the prior art method determines what torque needs to be applied to the satellite to follow that trajectory. Then the prior art method determines the gimbal rate trajectory that will apply that torque. But in either case, the gimbal rates, not the desired torque, are what actually drive the satellite. Thus it is not necessary to know the desired torque trajectory in order to control the satellite.

The use of torque as an input to the maneuver design has a significant difficulty. There are singularities in the distribution of torque to CMG gimbal rate, as explained above, due to the mechanical limits of the CMG's (at certain gimbal angles, they cannot deliver any additional torque in a certain direction). Because torque is used as an input in the prior art maneuver design, the trajectory has to avoid the singularities. The trajectory has to move through regions of diminished torque to avoid moving through a singularity. The gimbal angle space is free of singularities, so it does not suffer from regions of diminished torque. Thus, more torque is available for planning in the gimbal angle space. Essentially, the prior art method commands a particular torque (which may or may not hit a singularity), whereas the method in embodiments of the invention moves the CMG's, rather than commanding any particular torque.

In the embodiment of the invention described above, the trajectory is already in n dimensions. Since the trajectory is calculated in terms of gimbal angles from the start, there is no need to transform the trajectory into gimbal angles at the end. Thus, the method does not rely on a calculation of torque as a handle on the n-dimensional trajectory. This method does not pass through the distribution law to transform the trajectory from torque to gimbal rates. As a result, it does not suffer from the singularity contingencies as in the prior art method. There is no distribution law between the trajectory design and the commands given to the CMG's.

Additionally, in embodiments of the invention, the duration of the maneuver is shorter than the prior art maneuver. As shown in FIGS. 3A and 4A, the duration of the maneuver in FIG. 3A is about 4.5 seconds, while the duration of the maneuver in FIG. 4A is about 3.5 seconds. Thus, the straight trajectory in gimbal angle space provides a shorter duration maneuver than the straight trajectory in angular momentum space. As mentioned above, more torque is available in gimbal angle space, as it is free of singularities. Thus the CMG's can get up to full speed faster, which reduces the duration of the maneuver. The gimbal-angle trajectory is faster because the limiting parameter, gimbal rate, is in the gimbal angle space.

This improvement in duration is shown by comparing the paths of the CMG that has the largest change in gimbal angle from its initial gimbal angle to its final gimbal angle—the largest delta gimbal angle $\Delta\delta$ (marked on FIGS. 3A and 4A as $\Delta\delta_{max}$). In this example, CMG 4 moves the farthest from its initial gimbal angle (about 210°) to its final gimbal angle (about 40°)—so it has a $\Delta\delta$ of about 170°. (By comparison, CMG 1 moves about 70° total, CMG 2 moves about 10°, and CMG 3 moves about 110°.) In the maneuver of FIGS. 4A-C, CMG 4 accelerates the fastest (see FIG. 4B, where CMG 4 has the steepest curve). CMG 4 accelerates directly to its maximum velocity, stays there until it reaches its final gimbal angle, and then decelerates. The other CMG's do not need to move as far, and their accelerations and velocities are scaled proportionately so that they arrive at their final gimbal angles at the same time as CMG 4. Thus, in this embodiment, the CMG that moves the farthest also moves the fastest, providing higher torque and minimizing the total time for the maneuver.

By comparison, in the maneuver of FIGS. 3A-C, CMG 4 does not move directly to its final gimbal angle at its maximum velocity. As shown in FIG. 3B, only one CMG is at its maximum velocity at a time. (Maximum velocity is 1 and −1 radians per second.) CMG 3 is the first to reach maximum velocity, and it stays there until CMG 1 reaches its maximum velocity (at about 1.2 seconds), followed by CMG 4 (at about 1.7 seconds). The velocity of CMG 4 curves and varies at the beginning of the maneuver, so that it does not reach its maximum velocity until about 1.7 seconds. By comparison, in FIG. 4B, CMG 4 reaches its maximum velocity much sooner, at about 0.2 seconds. In both cases, CMG 4 is moving from the same initial gimbal angle to the same final gimbal angle. Because CMG 4 moves faster in FIG. 4B, the maneuver of FIG. 4 has a shorter duration than the maneuver of FIG. 3.

Figure 5:
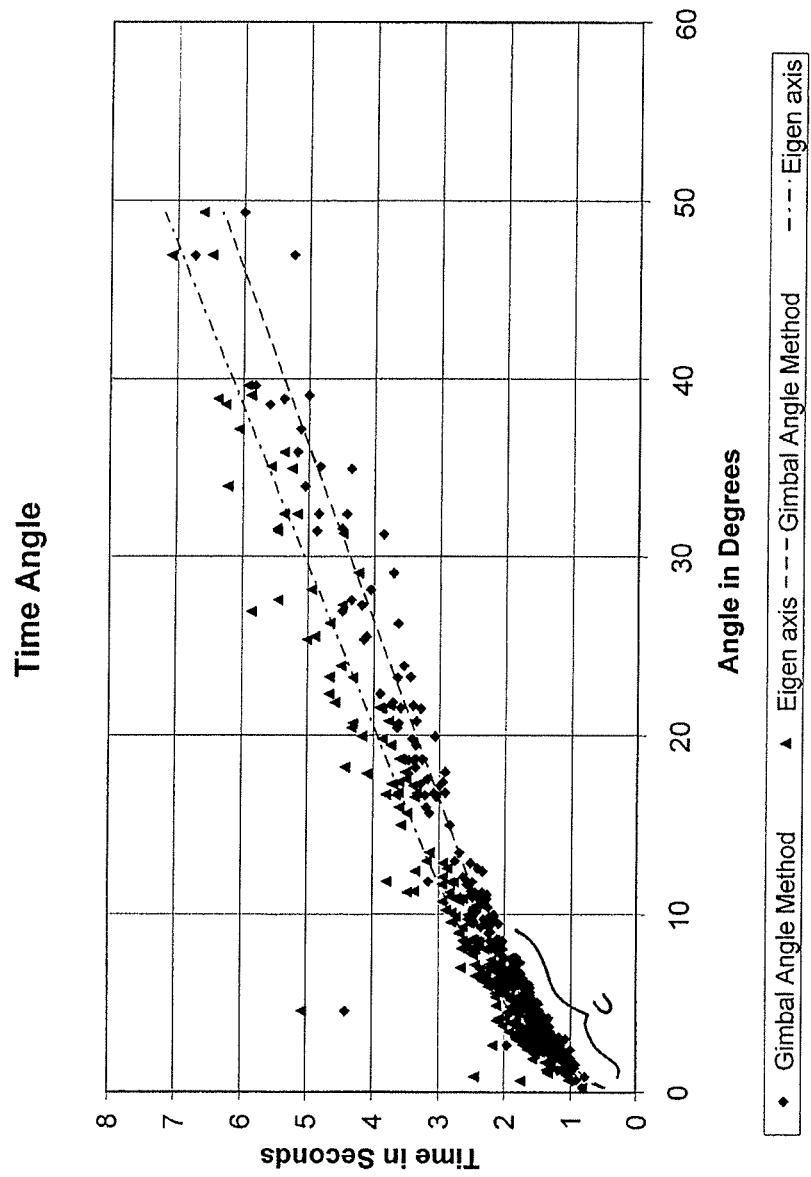
FIG. 5 is a chart showing maneuver duration versus maneuver angle including data points for Eigen-axis maneuvers and maneuvers according to embodiments of the invention.

An analysis of sample maneuvers calculated in angular momentum space and gimbal angle space was performed to compare maneuver durations. The results are shown in FIGS. 5-6. In FIG. 5, each data point is a simulated maneuver, with the maneuver time on the y-axis and the maneuver angle (the total angle through which the satellite moves) on the x-axis. The triangular data points are maneuvers designed in angular momentum space ("Eigen axis" maneuvers), and the diamond points are maneuvers designed in gimbal angle space according to an embodiment of the invention ("Gimbal Angle" maneuvers). The lines are the curve fits for the respective data points.

Referring to FIG. 5, on the left side of the chart, the maneuvers with the shortest duration and smallest angles are plotted. These maneuvers are so small that the satellite does not reach its maximum velocity during the maneuver. Thus, these maneuvers are acceleration-limited rather than velocity-limited. These maneuvers form the curved portion C of the chart. Above about 10 degrees, the data points follow a linear curve fit, as the maneuvers are large enough to be velocity-limited. As FIG. 5 shows, above about 10 degrees, the gimbal-angle maneuvers are about half to three quarters of a second faster than the "Eigen axis" (angular momentum) maneuvers. The gimbal-angle maneuvers show about an 8% improvement in data collection over the "Eigen axis" maneuvers.

Figure 6A:
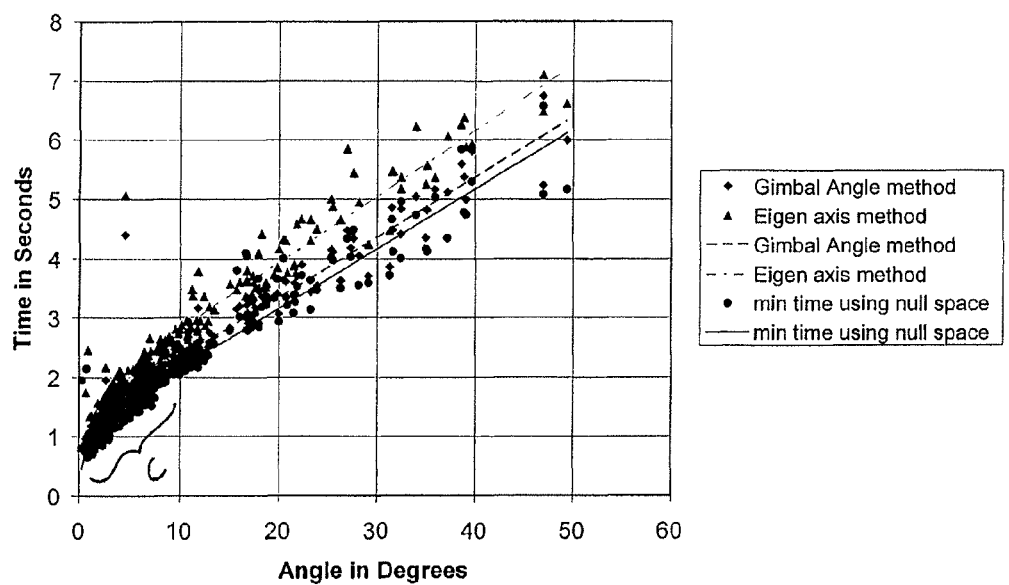
FIG. 6A is a chart showing the data points from FIG. 5 and also showing minimum-time maneuvers according to embodiments of the invention.
Figure 6B:
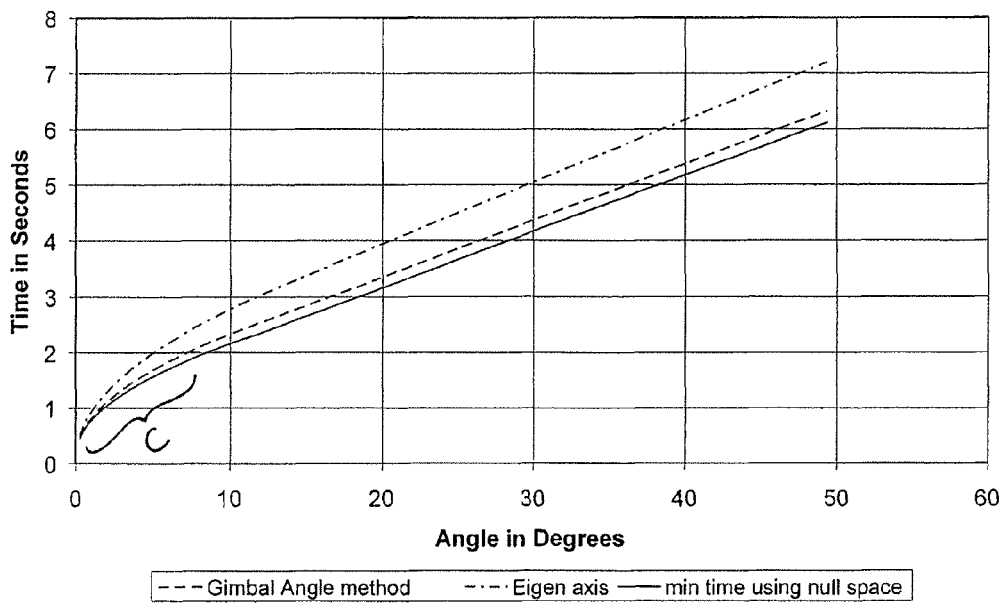
FIG. 6B is the chart of FIG. 6A with the data points removed for clarity.

FIG. 6A shows additional data points which are a subset of the gimbal-angle maneuvers. (FIG. 6B shows the curve fits from FIG. 6A with the data points removed for clarity.) When the maneuver is acceleration-limited rather than velocity-limited, there are many potential interim gimbal angle vectors that maximize the acceleration of the satellite during the maneuver, bringing the satellite to a peak angular momentum (which is less than the maximum deliverable angular momentum) before decelerating to the final scan rate. For example, two different n-dimensional vectors of gimbal angles can provide the same peak (non-maximum) angular momentum. But one of these gimbal angle vectors has a smaller maximum delta gimbal angle Δδ than the other, and therefore the CMG's can reach this gimbal angle vector faster, reducing the duration of the maneuver. These minimum-time data points are shown in FIG. 6A.

These data points are referred to as "null space" data points. This "null space" is the sub-set of gimbal angle vectors that deliver the same angular momentum to the satellite. That is, for any given angular momentum that is less than the maximum deliverable angular momentum, there are multiple gimbal angle vectors in gimbal angle space that all produce the same angular momentum. This sub-set is called the "null space" and has n minus 3 dimensions (meaning, for example, if there are six CMG's, then the null space is three dimensional; if five CMG's, then the null space is two dimensional). Motion of the CMG's within the null space produces no net torque on the satellite and leaves the angular momentum constant. This motion is known as a null space maneuver. One of the gimbal angle vectors (the minimum-time gimbal angle vector) in the null space minimizes the maximum gimbal angle change from the initial angular momentum to the peak angular momentum. Thus, for acceleration-limited maneuvers (that do not reach the maximum deliverable angular momentum), the maneuver duration can be further minimized by choosing this minimum-time gimbal angle vector.

Data points for such minimum-time acceleration-limited maneuvers are shown as circular data points in FIG. 6A, along the curved portion "C" of the chart. The curve fit for these minimum time maneuvers moves through the acceleration-limited portion of the chart (the "C" portion) faster than the other maneuvers. As shown, these maneuvers provide additional time savings of about 12% over the prior art maneuvers. After the curved portion "C", the curve fit enters a constant velocity phase where the curve fits are parallel (having a slope equal to the average maximum velocity of the satellite), because the velocity-limited maneuvers reach the maximum angular momentum for the satellite, which corresponds to a single unique gimbal angle vector.

Figure 7:
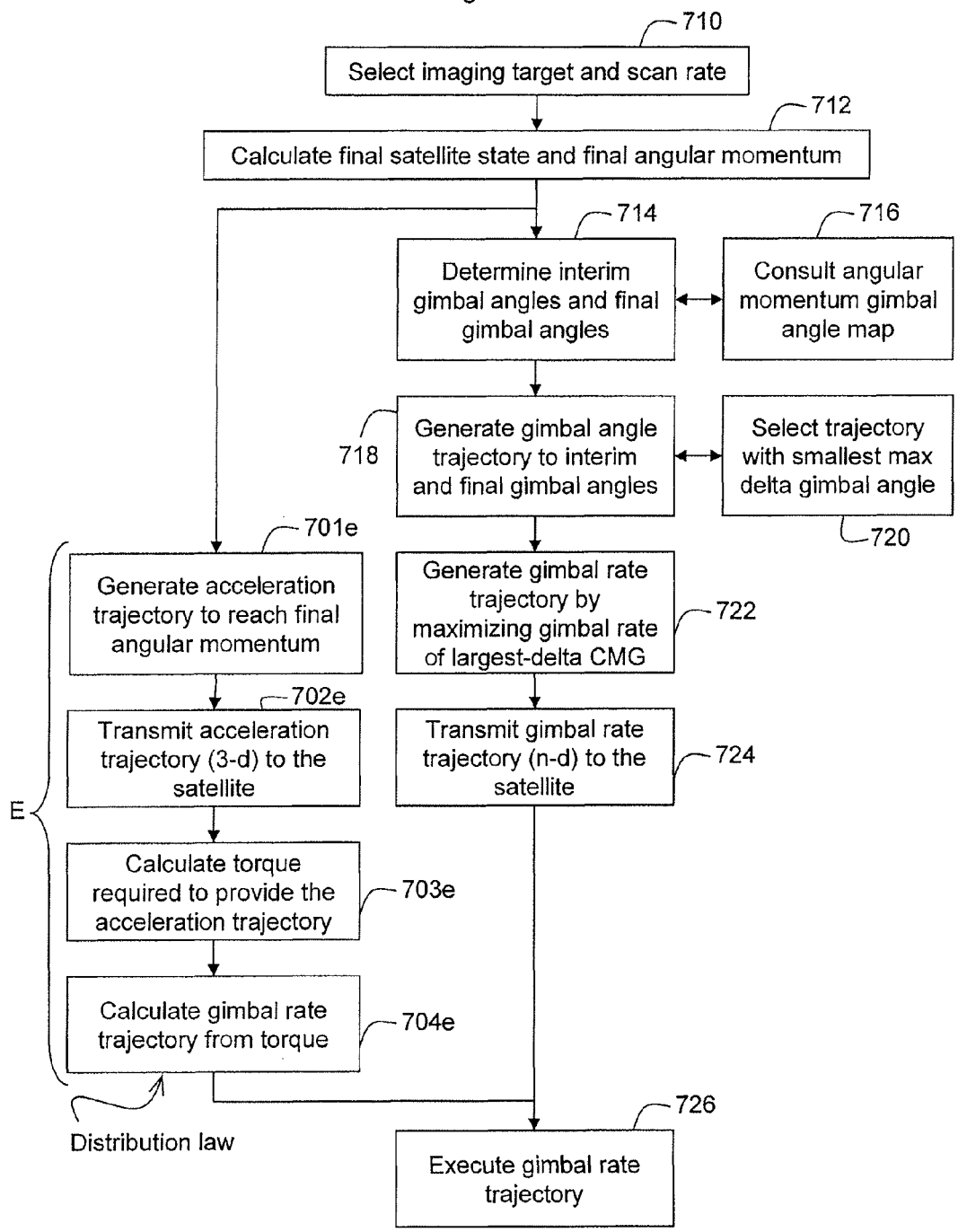
FIG. 7 is a flowchart showing a method for changing the attitude of a satellite, including a prior art method and an embodiment of the invention.

The steps for designing these maneuvers will now be described in more detail. FIG. 7 is a flowchart showing a method for changing the attitude of a satellite. The figure shows a method according to an embodiment of the invention, with a prior art Eigen-axis method shown in path "E". In both cases, the method starts with selecting an imaging target on the ground and a scan rate for the target in step 710. This step includes selecting a target such as target 22a, 22b, or 22c (FIG. 2) on the ground that needs to be imaged by the satellite. Depending on the characteristics of the target, the satellite's imaging capabilities, and other factors, the scan rate is also selected. The scan rate is the attitude rate of the satellite—its rate of rotation as it is taking the image. The scan rate enables the satellite to pan over an area to take a larger image. In some cases, the scan rate may be zero.

The selection of a target and scan rate 710 may be performed ahead of time, before the attitude maneuver is designed. An example of a method for selecting targets on the ground is described in co-pending U.S. patent application Ser. No. 12/534,789, filed Aug. 3, 2009, titled "Method For a Deeper Search in a Time Limited Image Satellite Planning Environment", the contents of which are incorporated by reference herein. The methods disclosed in that application may be used to generate the satellite's pointing path 24 (see FIG. 2) including a sub-set of targets for imaging. Then, the method of the present invention is used to design the maneuver between each sequential target 22a, 22b, 22c, and generate the satellite commands (the gimbal angle rates) to accomplish that maneuver. This maneuver design takes place during the validation phase described in the co-pending application just identified.

In step 710, a particular target and the desired scan rate for that target are selected. Next, the method includes calculating the final satellite state (quaternion/attitude and satellite rate) and its final angular momentum in step 712. The quaternion is a 4-dimensional vector of the satellite's attitude. The final satellite state includes its quaternion (or attitude) and satellite rate at the time of the imaging pass. This information can be calculated from the known orbit of the satellite and the known location of the target on the ground. The final satellite attitude is a three-dimensional vector of the satellite's attitude that points the satellite toward the target. The satellite rate $W_{sat\text{-}final}$ is a rate of rotation of the satellite, to give the desired scan rate. From this information, the satellite's final angular momentum is calculated from the relationship $H_{final} = J_{sat} * W_{sat\text{-}final}$) where $J_{sat}$ is the inertia tensor of the satellite.

The prior art Eigen-axis method will now be described, according to the path on the left in FIG. 7. This method includes calculating the acceleration trajectory of the satellite to reach the final angular momentum, in step 701e (the numeral "e" is used to denote the Eigen-axis method). In this method, the maneuver is designed to move the satellite directly from its known, initial angular momentum to an interim, maximum angular momentum, and then to the known final angular momentum (the scan rate). The inputs are the initial and final satellite attitudes and attitude rates. In step 701e, the method includes iteratively solving a set of differential equations in order to calculate the trajectory of the satellite between these initial and final states, moving along a straight line in angular momentum space from the initial angular momentum to the maximum interim angular momentum and another straight line to the final angular momentum. The trajectory is described in satellite attitude coordinates (three-dimensional space).

In step 701e, the satellite's velocity limit, acceleration limit, and jerk limit need to be taken into account, so that the acceleration trajectory does not violate any of these limits. Thus, step 701e may include the use of a polynomial which specifies these limits. The polynomial provides a jerk profile to an acceleration limit, then constant acceleration to a velocity limit, and then a jerk profile to decelerate to zero acceleration to run at constant velocity.

This satellite acceleration trajectory is then transmitted to the satellite in step 702e. As mentioned, the trajectory is a three-dimensional trajectory over time, including the satellite's x, y, and z pointing coordinates for the duration of the maneuver.

In order for the satellite to execute this maneuver, the satellite needs to know how to move its n onboard CMG's. Therefore, the three-dimensional acceleration trajectory needs to be transformed into an n-dimensional gimbal rate trajectory, which can be directly commanded to the CMG's. The satellite's on-board controller (controller 30 in FIG. 16, discussed below) performs this transformation from the three-dimensional acceleration trajectory to the n-dimensional gimbal rate trajectory. In order to accomplish this transformation, in step 703e, the method includes calculating the torque required to provide the acceleration trajectory. This calculation is described above. Then, in step 704e, the method includes calculating the gimbal rate trajectory from the torque, also described above. This gimbal rate trajectory is the final n-dimensional trajectory that is used to command the CMG's. The calculation in step 704e requires the use of the distribution law set forth above, to transform the trajectory from three to n dimensions.

Finally, the method includes executing the gimbal rate trajectory in step 726—that is, moving the CMG's at the rates in the gimbal rate trajectory. When the CMG's move according to the gimbal rate trajectory, the satellite moves along the satellite acceleration trajectory (from step 701e) to the desired final angular momentum (from step 712). This movement takes the satellite to the desired final attitude (pointing at the target) and satellite rate (scanning over the target), and the maneuver is complete.

As explained above, this Eigen-axis maneuver is designed to move the satellite along a single vector, in a straight direction, in angular momentum space (see FIG. 3C). The initial and final angular momentums are known, and the acceleration trajectory is calculated to rotate the satellite directly to a maximum interim angular momentum (to rotate the satellite through the maneuver) and then directly to the final angular momentum (to scan the target).

By contrast, an embodiment of the invention is shown on the right side of FIG. 7. In this embodiment, the maneuver is designed in n-dimensional gimbal angle space rather than three-dimensional angular momentum space. The trajectory is designed and transmitted to the satellite in n-dimensions. The method includes determining the interim gimbal angles and the final gimbal angles, in step 714. The interim gimbal angles are the "transit" gimbal angles that give the satellite the angular velocity it needs for the maneuver. The interim gimbal angles impart the maximum angular momentum to the satellite as it moves from its initial state to its final state. The final gimbal angles are those that provide the satellite with its desired scan rate.

As discussed above, for each angular momentum vector, there is at least one gimbal angle vector that corresponds to that angular momentum. If the CMG's are moved to those specific gimbal angles, then the satellite will have that angular momentum. For the final angular momentum (the scan rate), there are many gimbal angle vectors that correspond to the final scan rate. Knowing the stored angular momentum and the final scan rate, the CMG angular momentum can be calculated, and then the map is consulted to identify the corresponding gimbal angles. These are the potential final gimbal angle vectors. For the interim angular momentum (the transit rate), there is only one unique gimbal angle vector, as the interim angular momentum is maximized in order to minimize maneuver duration. That is, in this example, the interim angular momentum is the maximum angular momentum deliverable to the satellite by the CMG's, in the direction between the initial attitude and the final attitude. The map can also be consulted to identify this unique gimbal angle vector, that corresponds to the interim angular momentum. Accordingly, optionally, the method includes preparing and consulting an angular momentum gimbal angle map, in step 716, and using it to determine the interim gimbal angles (for the transit rate) and the final gimbal angles (for the scan rate), in step 714.

Notably, in one embodiment, locating the desired interim and final gimbal angles in step 714 is an iterative process using a computer. The solution is iteratively solved as the final duration of the maneuver is calculated, until the solution converges with the correct attitude and attitude rate at the correct time. There are various methods known in the art for iterative solutions, such as an extended radius of convergence Newtonian method.

Next, the method includes generating a gimbal angle trajectory from the initial gimbal angles to the interim gimbal angles and then to the final gimbal angles, in step 718. The initial gimbal angles are known from the position of the satellite prior to the maneuver (for example, the gimbal angles at the end of the previous maneuver). The initial attitude and initial gimbal angles can be provided by a computer or stored on a database. The interim gimbal angles are the unique gimbal angle vector that provides the maximum angular momentum for the satellite transit, identified in step 714. The potential final gimbal angle vectors are also known from step 714. In step 718, the gimbal angle trajectory is generated as a straight path from the initial gimbal angles to the interim gimbal angles, and then a straight path from the interim gimbal angles to the final gimbal angles.

At this point, one of the potential final gimbal angle vectors is chosen. The choice of the final gimbal angle vector can be made based on any desired criteria. In one embodiment, the method includes choosing the final gimbal angle vector that is closest to zero gimbal angles. That is, the final gimbal angles (that provide the scan rate) are closest to the gimbal angles that are defined as zero (where the sum of the angular momentum of the CMG's is zero). This is done by minimizing the largest difference in gimbal angle between zero and the final gimbal angle, in step 720. Thus, the final gimbal angle vector is the one that has the smallest maximum $\Delta\delta_{final-zero}$ (the maximum change in gimbal angle from the final gimbal angle to the zero gimbal angle). In an embodiment, gimbal angles closer to zero are preferred because the controller is less likely to encounter an unexpected singularity at zero gimbal angles. In embodiments of the present invention, the method combines the steps of designing the maneuver and designing the correction to reach the desired zero gimbal angle vector (which may be called a null space correction). These are both done by selecting the desired final gimbal angle vector that is closest to zero. Because the maneuver is designed in gimbal angle space, this desired gimbal angle vector is identified and the trajectory is designed to move directly to that vector.

In another embodiment, the method includes selecting the minimum-time gimbal angle trajectory by minimizing the largest change in gimbal angle from the interim gimbal angle to the final gimbal angle, in step 720. That is, in each gimbal angle trajectory, one of the CMG's moves farther than the others from the interim gimbal angle to the final gimbal angle; it has the largest change from its interim gimbal angle to its final gimbal angle, as compared to the other CMG's. This may be referred to as the maximum delta gimbal angle $\Delta\delta_{interim-final}$ (the maximum change in gimbal angle from the interim gimbal angle to the final gimbal angle). The final gimbal angle vector with the smallest maximum delta gimbal angle $\Delta\delta_{interim-final}$ is selected. The duration of the maneuver is constrained by the time necessary for the CMG with the largest delta gimbal angle $\Delta\delta_{interim-final}$ to complete its movement, so the minimum time trajectory is the one with the smallest maximum delta gimbal angle $\Delta\delta_{interim-final}$. Notably, the gimbal rate trajectory that minimizes $\Delta\delta_{interim-final}$ to arrive at the final gimbal angles may have a shorter duration than the gimbal rate trajectory that minimizes $\Delta\delta_{final-zero}$, to arrive at the final gimbal angles.

Next, the method includes generating a gimbal rate trajectory in step 722. In one embodiment, the first portion of the trajectory (from initial gimbal angles to interim gimbal angles) is generated by identifying the CMG with the maximum delta gimbal angle $\Delta\delta$ (initial to interim), and then maximizing the velocity of this CMG during that portion of the maneuver. This CMG needs to move across a larger angle than the other CMG's, so it is commanded to move at its maximum velocity. The other CMG's are then scaled proportionately, so that they move at whatever velocity is necessary to reach their interim gimbal angles at the same time as the first CMG. Then the second portion of the trajectory (from interim gimbal angles to final gimbal angles) is generated by identifying the CMG with the maximum delta gimbal angle $\Delta\delta$ (interim to final), maximizing its velocity, and scaling the other CMG's proportionally. This generates the gimbal rate trajectory in step 722. The gimbal rate trajectory is n-dimensional, as it includes a gimbal rate path (rate over time) for each one of the n CMG's. The CMG that moves the farthest (either from the initial angle to the interim angle, or from the interim angle to the final angle) is always either moving at the gimbal acceleration limit, moving at the gimbal velocity limit, or at rest with the maximum angular momentum already delivered to the satellite.

Next, the method includes transmitting the n-dimensional gimbal rate trajectory to the satellite, in step 724. The data file that is actually transmitted to the satellite may include the minimal necessary information for the satellite to generate the commands for the CMG's to follow the gimbal rate trajectory. Then, the method includes executing the maneuver 726, which includes moving the CMG's according to the gimbal rate trajectory. The movement of the CMG's will cause the satellite to move to the desired final attitude and attitude rate.

As used throughout this description, the term "maximum" (for example, maximum acceleration, maximum deceleration, maximum gimbal rate, maximum velocity, etc.) mean substantially the maximum allowable parameter for the satellite or CMG. For example, in the method of FIG. 7, the CMG with the largest $\Delta\delta$ accelerates to maximum gimbal rate (see step 722). This means substantially the maximum gimbal rate. That is, for example, the CMG may accelerate to 99% or 98% of the maximum gimbal rate, staying just below its true maximum in order to remain within safety or operating tolerances for the satellite. In one embodiment, the limit may be about 99% of the maximum, and in another embodiment about 98%, and in another embodiment about 95%, and in another embodiment, between 95-99%. In these cases, the CMG moves to substantially its maximum gimbal rate. The term "maximum" refers to substantially the maximum, and not necessarily the absolute maximum.

As FIG. 7 shows, the design of the maneuver on the ground, before transmission to the satellite, is different in the two methods. Additionally, the execution of the maneuver on the satellite is different, in both the satellite's physical movement and control law. First, the satellite moves differently because the trajectory of the maneuver is different. Second, the satellite's control law is different. In the Eigen-axis maneuver, the controller on the satellite transforms the three-dimensional satellite acceleration trajectory into an n-dimensional gimbal rate trajectory according to the distribution law (step 704e), before commanding the CMG's. However, in the embodiment of the invention, the gimbal rate trajectory is already provided to the satellite in n-dimensions in step 724. Thus, the control algorithm on the satellite is different for the two methods.

Figure 8:
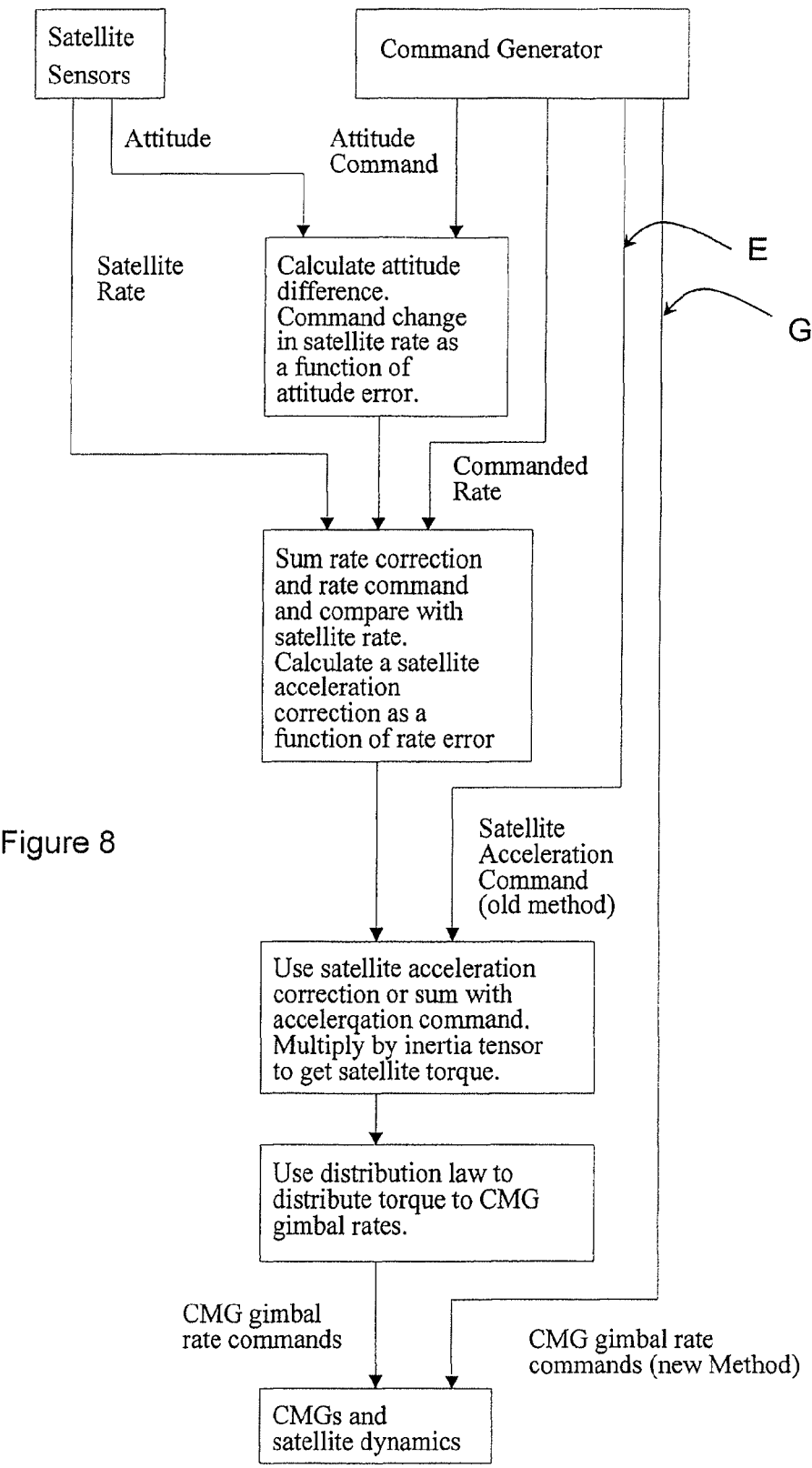
FIG. 8 is a flowchart showing a method for feedback control of a satellite, including a prior art method (as labeled) and an embodiment of the invention (as labeled).

An embodiment of a control algorithm for the satellite's onboard controller is shown in FIG. 8, with a prior art control algorithm identified for comparison. This shows the active control loop that takes place during the maneuver, to adjust for errors and perturbations that take place during the maneuver and make any necessary corrections. This control loop is a continuous feedback loop that runs during the duration of the maneuver. The command generator on the satellite generates attitude, rate, and acceleration commands that are delivered to the CMG's to command them to move. In embodiments of the invention, the satellite acceleration command is generated in gimbal angle space, as described above, and is an n-dimensional vector of gimbal rate over time. This command is given directly to the CMG's without passing through the distribution law first, as shown by the path labeled "G" (gimbal space). In FIG. 8, a prior art method is identified by the path labeled "E" (Eigen-vector) for comparison; in the prior art method, the acceleration command is generated in satellite position coordinates, in three dimensions, and is passed through the distribution law to transform it into CMG rate commands.

FIG. 8 also shows the satellite sensors, which sense the satellite's attitude and the satellite rate as the maneuver takes place and feed this information back into the control loop so that the controller can calculate any difference and correct for errors. The controller creates a corrected trajectory based on the sensors, and commands the CMG's to move according to the corrected trajectory. The CMG's move in response to the commands, and the satellite moves according to the dynamics of the satellite and CMG's. The sensors detect this movement and the control loop continues. In the prior art method (E), the corrected maneuver is generated in three-dimensional satellite acceleration space. In embodiments of the invention (G), the corrected maneuver is generated in n-dimensional gimbal angle space.

FIGS. 9 and 10 show controllers for the satellite according to the Eigen-axis method (FIG. 9) and an embodiment of the invention (FIG. 10). In both cases, the satellite attitude control system includes a command generator, a sensor package, the CMG's, and the control law. In FIG. 9, the command generator creates an acceleration command in three dimensions, and this command is passed through the distribution law to transform it into gimbal rate commands. The distribution law includes the pseudoinverse $A^T (A \cdot A^T)^{-1}$ matrix, which, as described above, can become rank deficient or singular. In FIG. 10, the acceleration command is in n dimensions, including the acceleration for each CMG. This gimbal rate command is fed directly to the CMG's, without needing to pass through the distribution law first. In one embodiment, a method of controlling a satellite includes transmitting a file to the satellite to change the control laws on the satellite's onboard controller from that in FIG. 9 to that in FIG. 10, in order to execute maneuvers according to the inventive method.

In FIGS. 9-10, Kp is the proportional gain (which gives the rate command). Kr is the rate gain (which gives the acceleration command). J is the inertia tensor of the satellite. The transfer function Kp may include an integrator depending on the satellite sensor package, as is known in the art.

Another example maneuver is shown in FIGS. 11-15, to demonstrate a maneuver that moves the satellite from a first position (imaging a first target) to a second position (imaging a second target). In this example, the maneuver is more complicated than the example in FIGS. 3-4 above, where the satellite moved from zero to 3.5 units of momentum along the x-axis. In this case, the satellite accelerates to a maximum angular momentum during the maneuver, and then decreases to a final, lower angular momentum at the end of the maneuver, to the final scan rate. Additionally, in this example, the satellite has six CMG's.

FIGS. 11-15 show a series of charts defining two maneuvers. The maneuver on the top (the "A" figures) is a prior art Eigen-axis maneuver. The maneuver on the bottom (the "B" figures) is a maneuver according to an embodiment of the invention. The two maneuvers are different, following different trajectories and lasting different durations. However, both maneuvers take the satellite from the same initial attitude and rate to the same final attitude and rate.

Figure 11A:
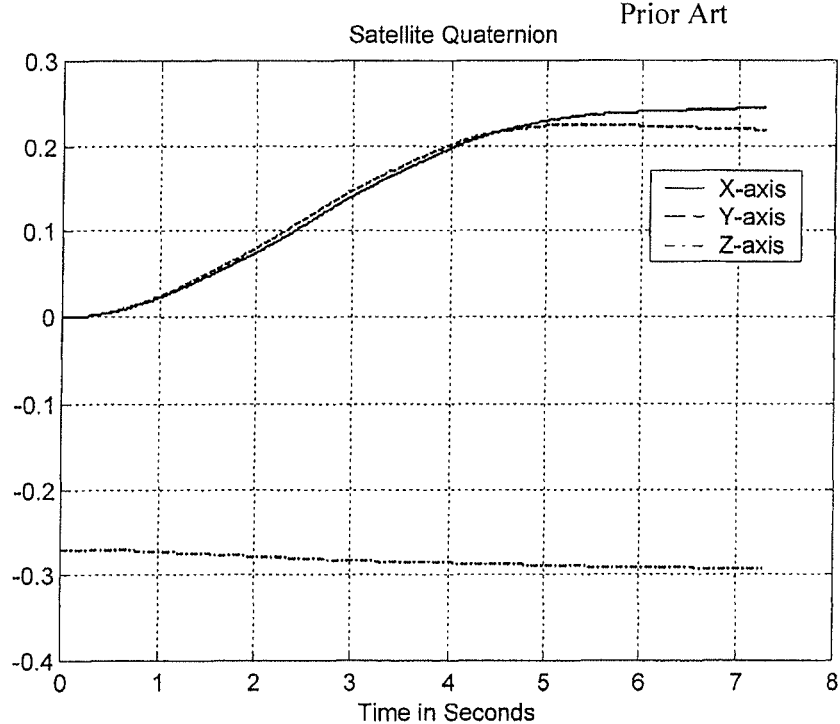
FIG. 11A is a chart showing satellite quaternion over time according to a prior art Eigen-axis maneuver.
Figure 11B:
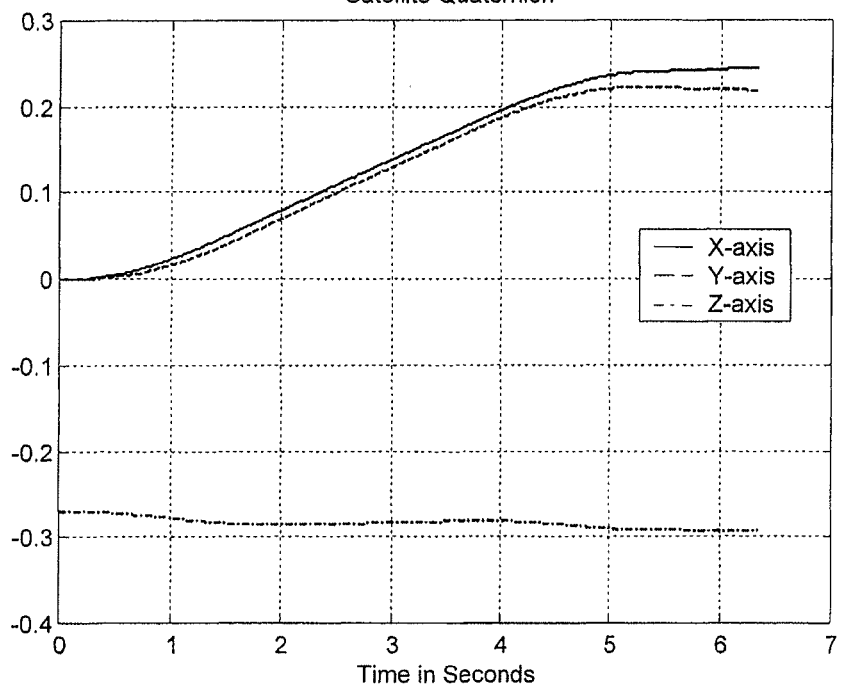
FIG. 11B is a chart showing satellite quaternion over time according to an embodiment of the invention.

FIGS. 11A-B show satellite quaternion over time for the two maneuvers. The initial and final quaternion is the same for both maneuvers. However, the trajectories differ. The satellite moves through a different spatial trajectory in FIG. 11A than in FIG. 11B. FIGS. 12A-12B show the corresponding satellite rate charts for the two maneuvers.

Figure 13A:
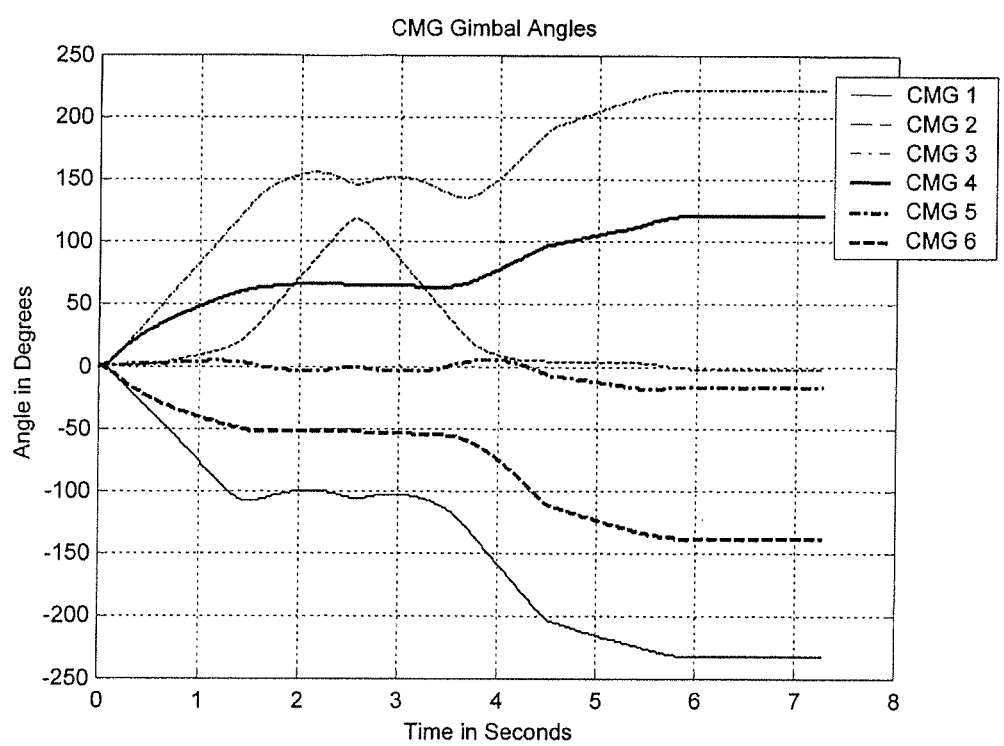
FIG. 13A is a chart showing CMG gimbal angles over time according to the maneuver of FIG. 11A.
Figure 13B:
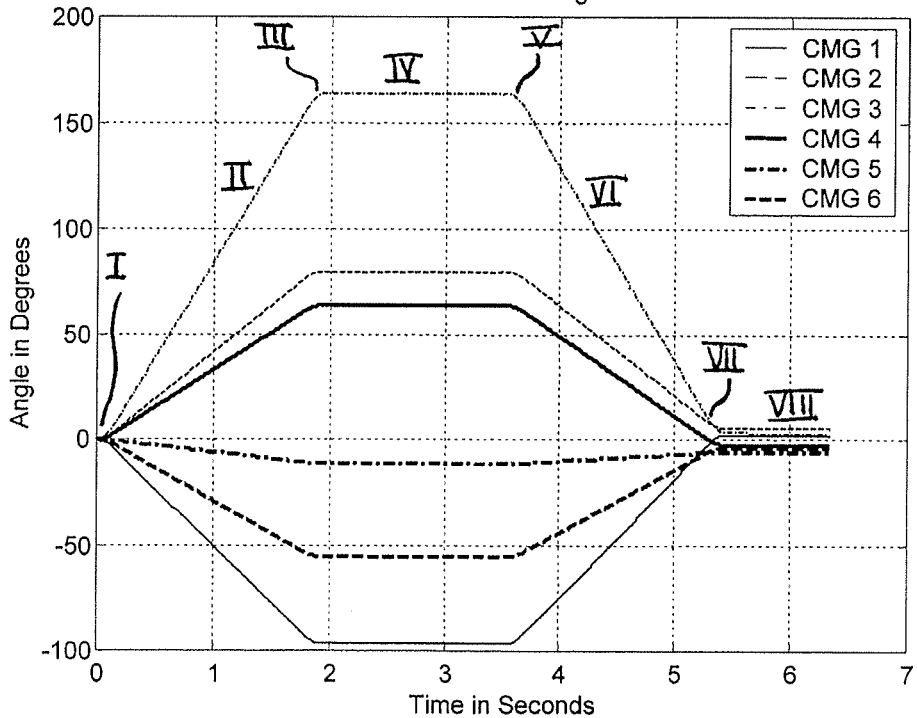
FIG. 13B is a chart showing CMG gimbal angles over time according to the maneuver of FIG. 11B.

FIGS. 13A-B show CMG gimbal angles over time for the two maneuvers. In both cases, all six CMG's start at a zero gimbal angle $\delta$. In the Eigen-axis maneuver of FIG. 13A, the CMG's end at various non-zero positions ranging from about 220 degrees to about −230 degrees. In the maneuver of FIG. 13B, the CMG's move to interim gimbal angles to give the satellite a maximum transition speed during the maneuver, and then the CMG's end at non-zero final gimbal angles that are close to zero. The CMG's are driven directly to the interim gimbal angles necessary for maximum angular rate, and then they remain there until it is time to decelerate to the scan rate. This maneuver imparts higher torque to the satellite than the maneuver of FIG. 13A.

Figure 14A:
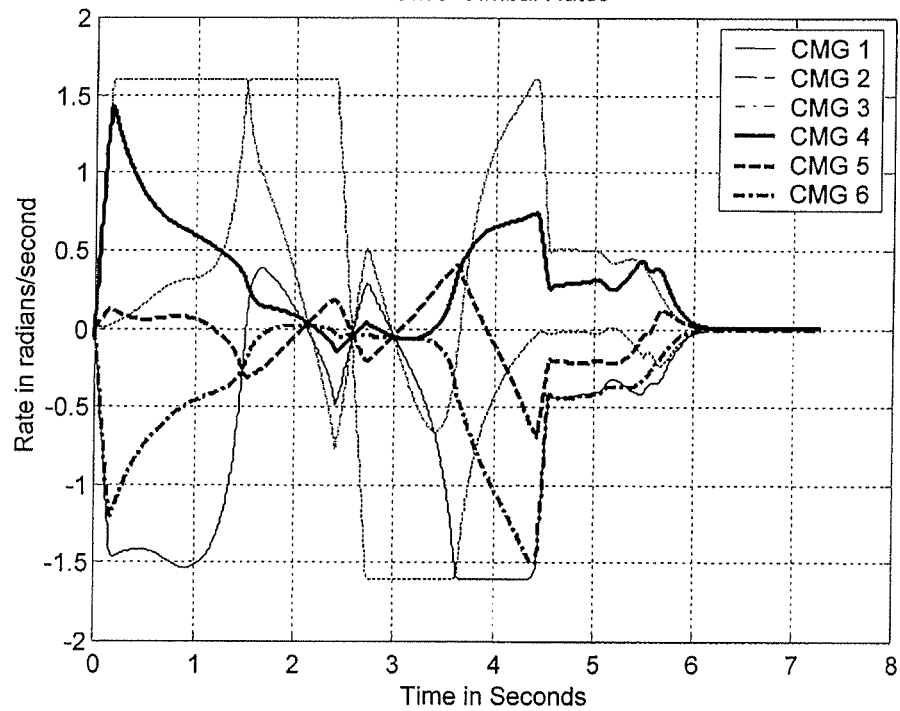
FIG. 14A is a chart showing CMG gimbal rates over time according to the maneuver of FIG. 11A.
Figure 14B:
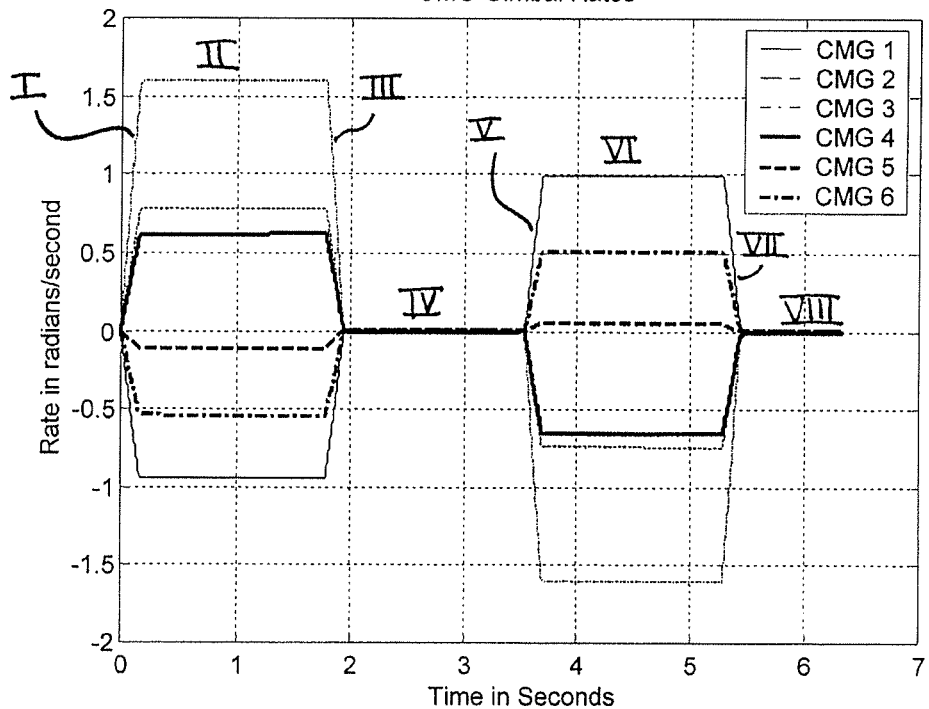
FIG. 14B is a chart showing CMG gimbal rates over time according to the maneuver of FIG. 11B.

The gimbal rates for these two maneuvers are shown in FIGS. 14A-B. In FIG. 14A, the CMG's accelerate and decelerate and then accelerate again in order to move the CMG's along the curved gimbal angle paths shown in FIG. 13A. Thus the velocity profiles are curved and even move back and forth between positive and negative velocity. By contrast, in FIG. 14B, the CMG's accelerate to an initial velocity to move to their interim gimbal angles, then decelerate to zero velocity to hold steady at those angles (as the satellite is rotating at maximum velocity), then accelerate again to move toward the final gimbal angles, and then decelerate to zero velocity to hold steady at the final gimbal angles (giving the satellite its final scan rate). The CMG paths in FIG. 13B are more direct than the prior art, and as a result the CMG velocity profiles in FIG. 14B are also more direct. Additionally, as shown in FIG. 14B, the CMG's move substantially simultaneously, meaning their phases I-VIII happen at substantially the same time. The CMG's accelerate at the same time, move at constant velocity at the same time, and maintain their interim angles with zero velocity at the same time. Their movements are scaled proportionally to each other.

As shown in FIG. 14B, at phase I, CMG 3 accelerates to the largest velocity of all of the CMG's. This CMG moves through the largest delta gimbal angle $\Delta\delta$ and so it moves at the largest velocity. Each CMG has a first path from its initial gimbal angle to its interim gimbal angle, and a second path from its interim gimbal angle to its final gimbal angle. The first path of CMG 3 through phases I, II, and III (from its initial gimbal angle to its interim gimbal angle) includes accelerating at substantially its maximum acceleration (phase I) to its maximum velocity (or substantially its maximum velocity) (phase II), and then decelerating at maximum deceleration (phase III) to zero velocity, when it reaches its interim gimbal angle. The second path of CMG 3 (phases V through VII) includes accelerating in the negative direction (phase V) to a substantially maximum velocity (phase VI), and then back to zero velocity (phase VII), in order to move from its interim gimbal angle to its final gimbal angle.

FIG. 14B also shows that for each CMG, in its first path from its initial gimbal angle to its interim gimbal angle (phases I-III) and in its second path from its interim gimbal angle to its final gimbal angle (phases V-VII), the velocity of each CMG does not cross zero. This means that the CMG does not switch directions during each of these paths (from initial to interim, or from interim to final gimbal angles). The CMG does not move past its target gimbal angle (interim or final) and then return to it, or move back and forth on its way to its target gimbal angle. The velocities shown in FIG. 14B are the first derivatives of the gimbal angles shown in FIG. 13B. Because each CMG goes directly to its target gimbal angle without overshooting, or moving back and forth and switching directions, the velocities (from initial to interim or from interim to final) do not cross zero.

Figure 15A:
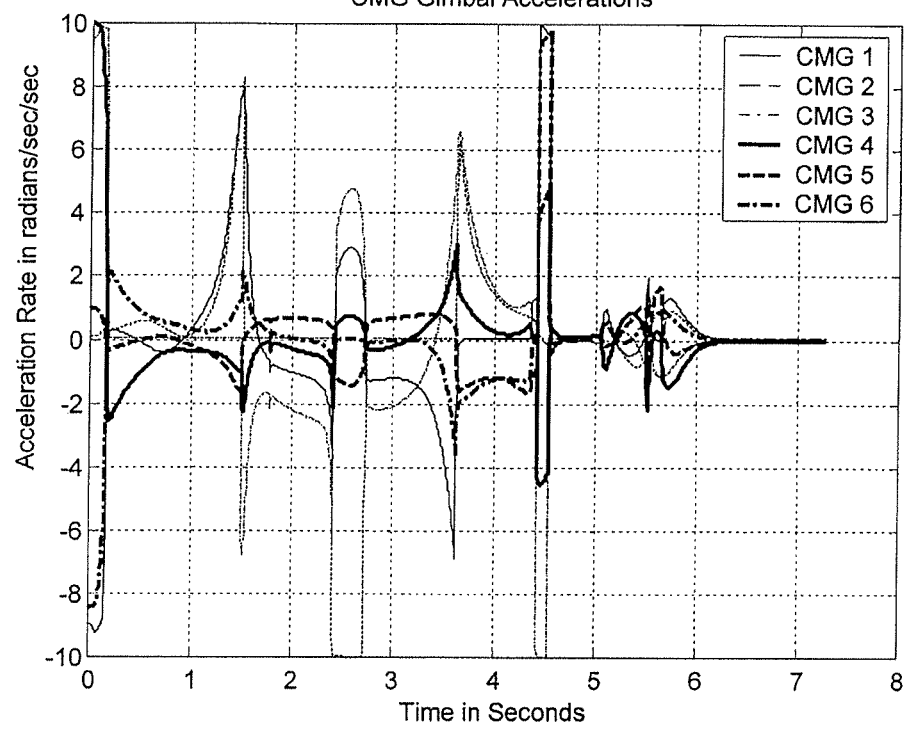
FIG. 15A is a chart showing CMG acceleration over time according to the maneuver of FIG. 11A.
Figure 15B:
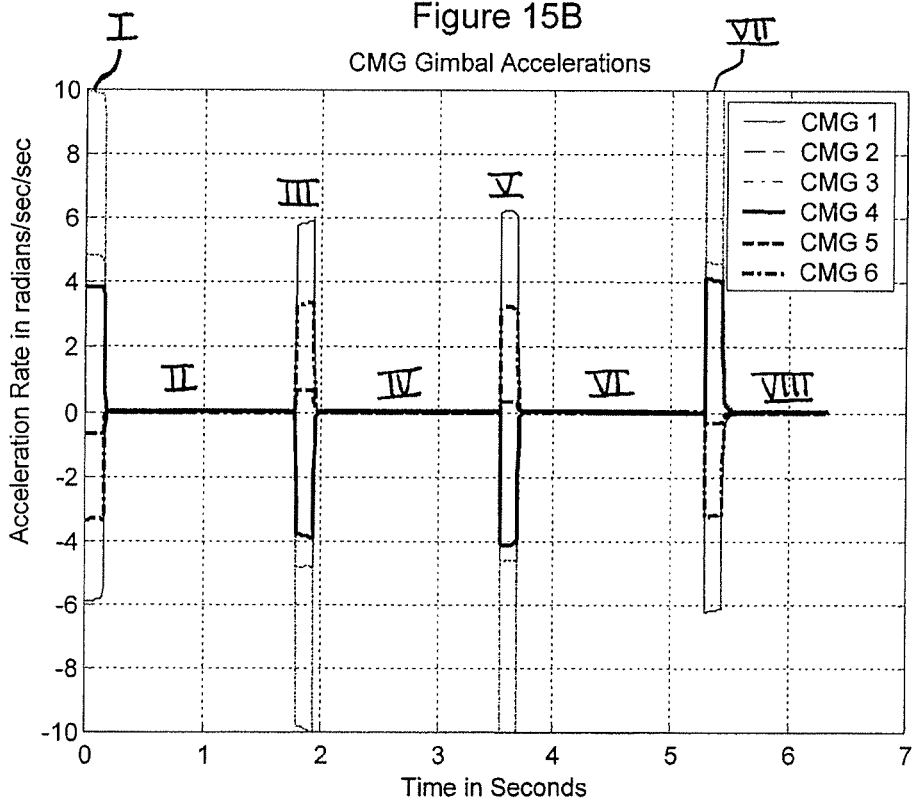
FIG. 15B is a chart showing CMG acceleration over time according to the maneuver of FIG. 11B.

The CMG acceleration profiles are shown in FIGS. 15A-B. In FIG. 15B, the CMG's move through four jerks, or changes in acceleration. Each CMG moves through four distinct jerk pulses, and the pulses are proportional to each other and substantially simultaneous. The first jerk is identified as phase I on FIG. 15B. At this point the CMG's accelerate from zero velocity to a nonzero velocity, in order to move the satellite and change its attitude. The acceleration continues for a brief duration until the CMG that needs to move the farthest reaches the velocity limit, the maximum velocity at which the CMG can move. At that point the acceleration drops to zero because the CMG cannot accelerate any farther. The other CMG's accelerate proportionately during this time, so that they reach their respective velocities at the same time that the first CMG reaches the maximum velocity.

At phase II on FIG. 15B, the CMG's have reached their respective velocities and the acceleration of all of the CMG's drops to zero. The CMG's move at constant velocity during this phase, as they move to their respective interim gimbal angles. The acceleration for all CMG's is zero, although their velocities may be different, as shown in FIG. 14B. The CMG that has to move the farthest has the maximum velocity, and the others are scaled proportionately.

The second jerk takes place at phase III on FIG. 15B, where the CMG's reach their interim gimbal angles and decelerate to zero velocity. At phase IV, the CMG's maintain zero velocity and hold steady at their interim gimbal angles. At this set of interim gimbal angles, the satellite is rotating at the maximum rate toward its final attitude. This phase lasts as long as necessary depending on the size of the maneuver, the angle through which the satellite moves. The interim gimbal angles are determined by the maximum angular momentum that the CMG's can deliver to the satellite in the direction between the initial attitude and final attitude.

The third jerk takes place at phase V, at which point the satellite has traveled through most of the distance to its final attitude, and the CMG's need to move to their final gimbal angles which will give the desired scan rate. Accordingly, at phase V, the CMG's accelerate to their respective velocities. Again, the CMG that has to move the farthest accelerates to the CMG velocity limit, and the other CMG's accelerate proportionately according to how far they have to move. During phase VI, acceleration is zero as the gimbals move at their respective velocities toward their final gimbal angles.

The fourth and final jerk takes place at phase VII, at which point the CMG's are approaching their final gimbal angles and decelerate to zero velocity. At phase VIII, the CMG's reach zero velocity and hold steady at their final gimbal angles. At the final gimbal angles, the satellite has the desired attitude and scan rate that were selected at the beginning of the maneuver, so that the satellite scans over the selected target on the ground.

The number I-VIII are marked on FIGS. 13B, 14B, and 15B for reference, to identify the movement of the CMG's through the maneuver.

Comparing FIGS. 15A and 15B, the CMG's in FIG. 15A complete their acceleration and reach their final gimbal angles after a maneuver duration of over 6 seconds. The CMG's in FIG. 15B reach their final gimbal angles after a maneuver duration of about 5.5 seconds. Notably, the "A" maneuver would be even longer if it included a correction at the end to move the CMG's to the final gimbal angles of FIG. 13B, which are closer to the desired zero angle set. The final gimbal angles in FIG. 13A and the final gimbal angles in FIG. 13B provide the same final angular momentum, but the gimbal angles in FIG. 13B are closer to zero. In an embodiment, gimbal angles closer to zero are preferred because the controller is less likely to encounter an unexpected singularity at zero gimbal angles. Thus, if a correction is added to the end of the maneuver of FIG. 13A to bring the gimbal angles to the more preferred final angles, then the maneuver is even longer. The maneuver of FIG. 13B is shorter in duration with both the final angular momentum and preferred gimbal angle constraints met.

By designing the maneuver in gimbal angle space rather than angular momentum space, the maneuver is designed in n dimensions instead of three dimensions. The trajectory does not need to be transformed from a three-dimensional trajectory to an n-dimensional trajectory. As a result, the maneuver can be designed anywhere in the n-dimensional gimbal angle space. In the prior art, when the maneuver is designed in three dimensions, the trajectory is limited and cannot reach all gimbal angle vectors in the n-dimensional space. With only three handles on the input into an n-dimensional output, the output space is limited, and there are some gimbal angle vectors that are not available. Planning in the larger n-dimensional space gives more freedom over the trajectory.

Figure 16:
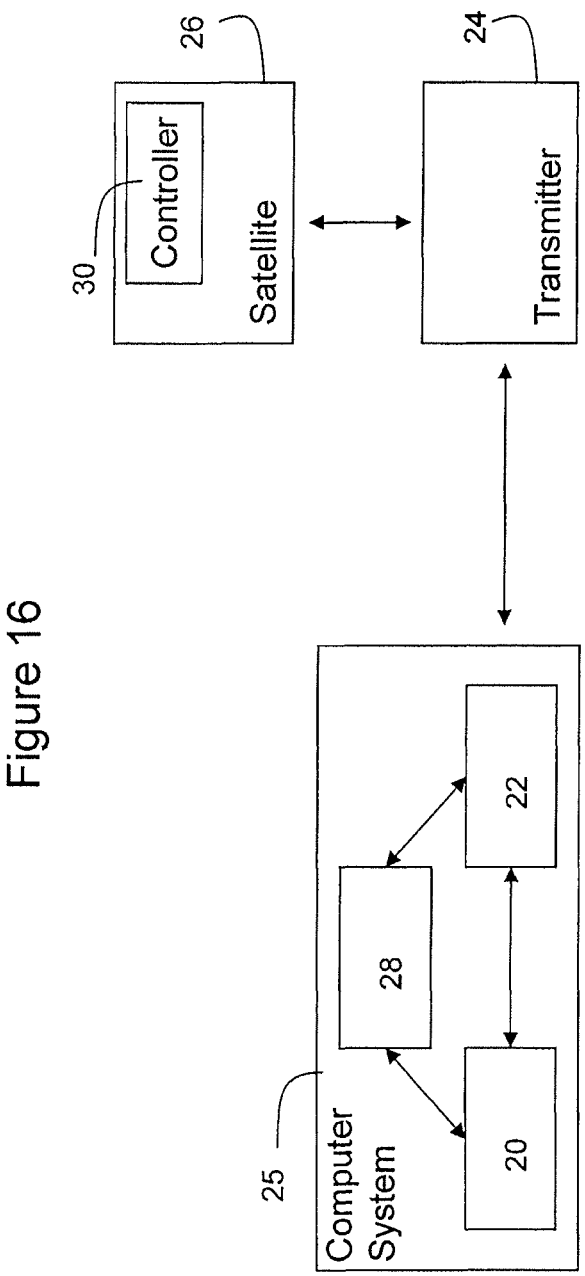
FIG. 16 is a schematic representation of a computer system, a transmitter, and a satellite, according to an embodiment of the invention.

A system for carrying out the satellite maneuver is shown in FIG. 16. In an embodiment of the invention, the system includes a ground-based computer system 25, a transmitter 24, and a satellite 26. The computer system includes one or more computers. A computer could be a single processing unit or multiple processing units. The computer system 25 generates an output file that has the gimbal rate trajectory for the maneuver. In an embodiment, the output file is a compressed data file with gimbal rates versus time. The transmitter 24 transmits this output file to the satellite 26 in orbit. The transmitter 24 may be, for example, an antenna or a telescope. The satellite 26 receives the output file with the trajectory and inputs the file to the onboard controller 30. The trajectory commands are stored in the computer memory on the satellite until it is time to execute them. The controller 30 includes a command generator, which sends the appropriate commands to each CMG to execute the maneuver, as shown in FIG. 10. When the CMG's receive the commands, they move as commanded, which causes the satellite to rotate. The CMG's follow the commands through the maneuver, until the satellite 26 reaches its final attitude with the desired satellite rate. The satellite then takes one or more images of the target(s), including potentially a scanning image over an area on the ground. In one embodiment, the images are transmitted by the satellite back to the ground where they are displayed.

The calculations described above to generate the gimbal rate trajectory are performed by the computer system 25, as shown in FIG. 16. According to one embodiment, the computer system 25 includes a first array of computer devices 20 and a second array of computer devices 22. Each array includes multiple computer processors working concurrently to execute computer instructions stored in corresponding memory devices. In one embodiment, the two arrays of computer devices both have access to a database 28 hosted in a hard disc drive or drive array or other memory device. The database 28 stores information that the computer devices 20, 22 need for the gimbal rate calculations, such as, for example, the orbit of the satellite, the location of targets on the ground, the desired scan rate for each target, the selected subset of targets, and the angular momentum gimbal angle map (see step 716 in FIG. 7). The computer devices 20, 22 refer to this information to determine the satellite's initial attitude and attitude rate, the desired final attitude and attitude rate, and the gimbal angles that correspond to a particular angular momentum vector.

In one embodiment, the computer devices 20, 22 work in parallel to generate the gimbal rate trajectory. The computer devices 20, 22 include an array of processors that work in parallel to solve the differential equations and generate the trajectory. Various techniques are known in the art to divide calculations (such as matrix inversions, integrations, etc.) over multiple processors to reduce processing time. In one example, one computer acts as a supervisory computer, with several other computers working in parallel on different portions of the problem.

In one embodiment of the invention, a method of generating an attitude maneuver includes first determining the size of the maneuver. The method identifies a threshold angle to distinguish between small maneuvers, in which the total angle through which the satellite moves is small (such as below 10 degrees, or below 5 degrees, or below 1 degree, or below 0.5 degrees), and larger maneuvers. The method then includes implementing an Eigen axis method in angular momentum space for small maneuvers, and a gimbal angle method for larger maneuvers. When the maneuver is very small, it is not likely to impinge on a singularity in the distribution law, as it is not likely to reach a torque saturation. Accordingly, the maneuver can be designed in Eigen-axis space. On the ground, if the maneuver is small, then both the Eigen-axis and gimbal angle trajectories are generated. The maneuver that takes the least time is entered into the queue to upload to the satellite. If the maneuver is larger than the threshold, then only the minimum time gimbal angle maneuver is generated. Thus, in one embodiment, the gimbal rate trajectory is generated for maneuvers that are greater than approximately 1 degree in angular distance (the angle through which the satellite moves from its initial attitude to its final attitude). In another embodiment, the maneuver is greater than approximately 5 degrees, and in another embodiment, greater than approximately 10 degrees.

Figure 17:
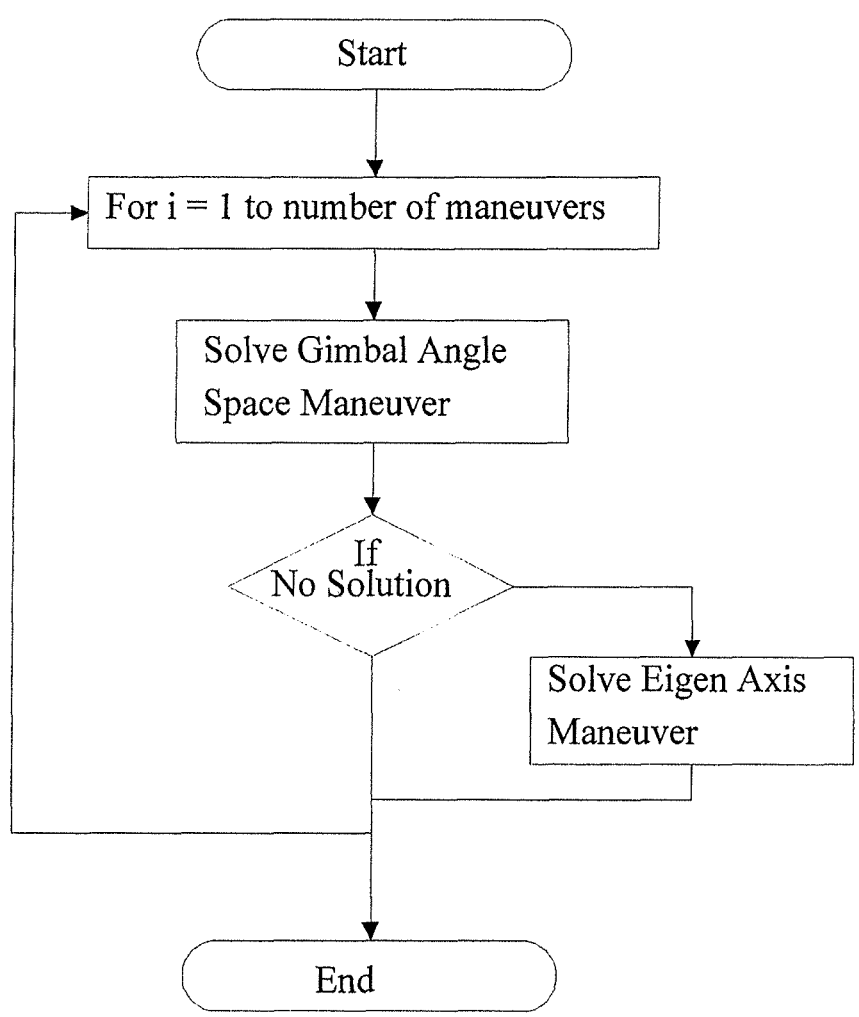
FIG. 17 is a flowchart showing a method of generating an attitude maneuver according to an embodiment of the invention.

Another embodiment of this method is shown in FIG. 17. In this embodiment, the method first includes solving for the maneuver in gimbal angle space. If there is no solution, due to the small size of the maneuver, then the method includes solving for the Eigen-axis maneuver in angular momentum space. For example, it has been found that a very small circular maneuver, moving through about 0.25 degrees, does not converge in the gimbal angle space method. In this rare case, the Eigen axis method can be used. Thus, the method in FIG. 17 includes a rare contingency to use the Eigen axis method if necessary. Otherwise, in most cases, the method will generate and implement the gimbal angle space maneuver. This method is repeated to generate maneuvers to point to and image all of the targets in the imaging pass.

Figure 18A:
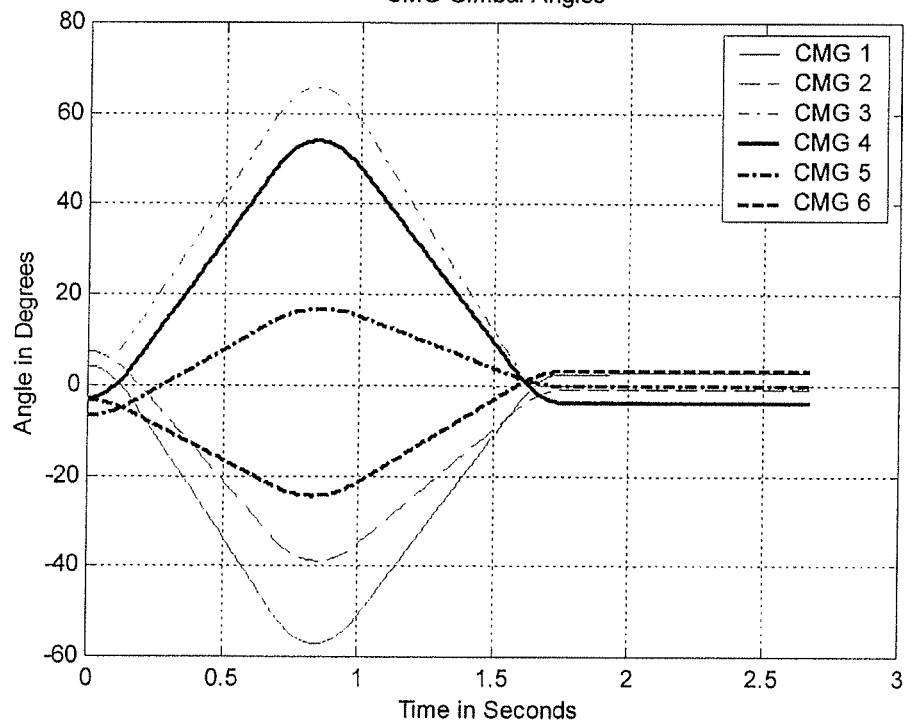
FIG. 18A is a chart showing CMG gimbal angles over time according to an embodiment of the invention.
Figure 18B:
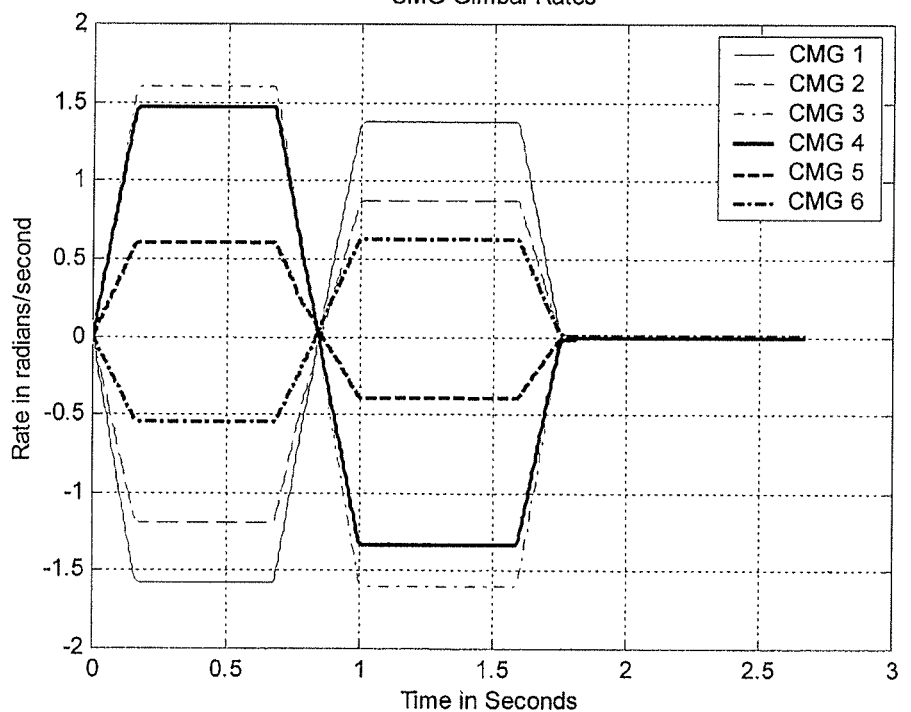
FIG. 18B is a chart showing CMG gimbal rates over time according to the maneuver of FIG. 18A.
Figure 18C:
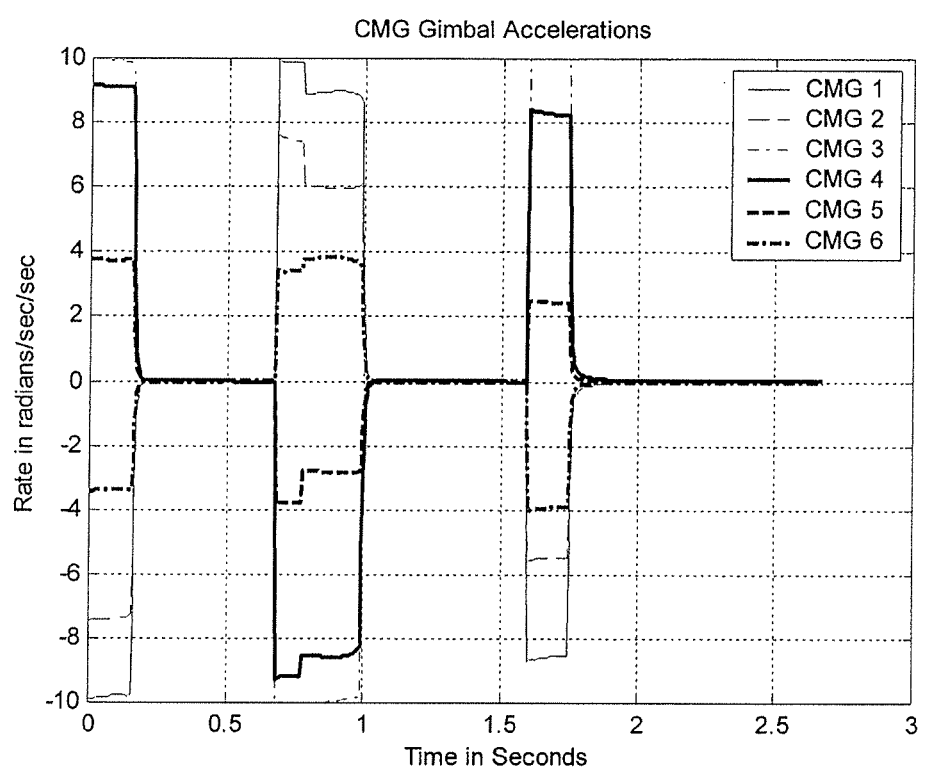
FIG. 18C is a chart showing CMG gimbal accelerations over time according to the maneuver of FIG. 18A.

FIGS. 18A, 18B, and 18C show an example of an acceleration-limited maneuver according to an embodiment of the invention. In an acceleration-limited maneuver, the maneuver is short enough (in angular distance and duration), that the CMG's cannot deliver all of the available angular momentum before the maneuver is over. The CMG's move at maximum acceleration, so the maneuver is referred to as acceleration-limited. There is no portion of the maneuver in which the CMG's have zero velocity at interim gimbal angles, while the satellite coasts toward its final attitude. Instead, as soon as the CMG's reach an interim gimbal angle, they immediately turn around and move toward the final gimbal angles. The gimbal angles are shown in FIG. 18A, moving from an initial gimbal angle to an interim gimbal angle and then immediately moving to a final gimbal angle (near zero). FIG. 18B shows the CMG gimbal rates, and FIG. 18C shows the gimbal accelerations. By comparison, the velocity-limited maneuver in FIGS. 13B, 14B, and 15B includes an interim period where the CMG's hold steady at their interim gimbal angles, at zero velocity.

Although the present invention has been described and illustrated in respect to exemplary embodiments, it is to be understood that it is not to be so limited, since changes and modifications may be made therein which are within the full intended scope of the this invention.

What is claimed is:

1. A method for changing the attitude of a satellite that is controlled by a plurality of control moment gyroscopes movable through gimbal angles, the method comprising:
   selecting a target for imaging;
   determining a final attitude for pointing the satellite to the target and a final satellite rate for imaging the target;
   providing an initial attitude and an initial set of gimbal angles comprising an initial gimbal angle for each control moment gyroscope;
   generating a first portion of a gimbal rate trajectory from the initial set of gimbal angles to an interim set of gimbal angles comprising an interim gimbal angle for each control moment gyroscope, the generation of the first portion of the gimbal rate trajectory comprising:
      determining the unique interim gimbal angles that impart the maximum angular momentum to the satellite;
      assigning a substantially maximum velocity to the control moment gyroscope with the largest difference between its initial and interim gimbal angles; and
      assigning a proportionate velocity to the remaining control moment gyroscopes such that they reach their interim gimbal angles at the same time as the control moment gyroscope with the largest difference between its initial and interim gimbal angles;
   generating a second portion of the gimbal rate trajectory from the interim set of gimbal angles to a final set of gimbal angles comprising a final gimbal angle for each control moment gyroscope, the generation of the second portion of the gimbal rate trajectory comprising:
      determining the final gimbal angles that achieve the final attitude for pointing the satellite to the target and the final satellite rate for imaging the target,
      assigning a substantially maximum velocity to the control moment gyroscope with the largest difference between its interim and final gimbal angles; and
      assigning a proportionate velocity to the remaining control moment gyroscopes such that they reach their final gimbal angles at the same time as the control moment gyroscope with the largest difference between its interim and final gimbal angles; and
   moving the control moment gyroscopes on the satellite according to the gimbal rate trajectory.

2. The method of claim 1, further comprising accessing an angular momentum gimbal angle map.

3. The method of claim 2, further comprising using the map to identify the interim set of gimbal angles and the final set of gimbal angles.

4. The method of claim 1, wherein the gimbal rate trajectory includes a first path for one of the control moment gyroscopes from its initial gimbal angle to its interim gimbal angle or from its interim gimbal angle to its final gimbal angle, and wherein the first path comprises a substantially maximum acceleration, a substantially maximum velocity, and a substantially maximum deceleration.

5. The method of claim 1, wherein generating the gimbal rate trajectory comprises using a computer programmed to iteratively solve for the gimbal rate trajectory.

6. The method of claim 1, wherein moving the control moment gyroscopes comprises accelerating a first control moment gyroscope at a substantially maximum gimbal acceleration to a substantially maximum gimbal rate, and maintaining the substantially maximum gimbal rate until decelerating the first control moment gyroscope at the substantially maximum gimbal acceleration to zero velocity at its interim or final gimbal angle.

7. The method of claim 1, further comprising transmitting the gimbal rate trajectory to the satellite.

8. The method of claim 1, wherein generating a second portion of the gimbal rate trajectory further comprises determining the final gimbal angles that minimize an angular momentum vector of the final gimbal angles.

9. The method of claim 1, wherein generating a second portion of the gimbal rate trajectory further comprises determining the final gimbal angles that minimize the largest change in gimbal angle from the interim gimbal angle to the final gimbal angle.

* * * * *